US008423262B2

(12) United States Patent
Matsushita et al.

(10) Patent No.: US 8,423,262 B2
(45) Date of Patent: Apr. 16, 2013

(54) VEHICLE CONTROL APPARATUS

(75) Inventors: Koki Matsushita, Susono (JP); Shin Noumura, Susono (JP); Ken Koibuchi, Hadano (JP); Kaoru Ohtsuka, Mishima (JP); Shinichi Soejima, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 490 days.

(21) Appl. No.: 12/793,315

(22) Filed: Jun. 3, 2010

(65) Prior Publication Data

US 2011/0005212 A1    Jan. 13, 2011

(30) Foreign Application Priority Data

Jul. 9, 2009   (JP) ................ 2009-163128

(51) Int. Cl.
*G06F 19/00*   (2011.01)
*F02P 5/15*    (2006.01)
*F01N 3/20*    (2006.01)

(52) U.S. Cl.
USPC ............. 701/102; 123/406.23; 123/406.55; 60/285

(58) Field of Classification Search ........... 123/339.14, 123/339.16, 339.18, 406.23, 406.55; 701/102, 701/103, 110; 60/274, 277, 284–286
See application file for complete search history.

(56) References Cited

U.S. PATENT DOCUMENTS 5,211,011 A * 5/1993 Nishikawa et al. ......... 60/285
5,315,823 A * 5/1994 Nishikawa et al. ......... 60/285
6,212,879 B1 * 4/2001 Nishimura et al. ......... 60/285
7,444,233 B2 * 10/2008 Takatsuto et al. .......... 60/285

FOREIGN PATENT DOCUMENTS

| JP | 2-256840 | | 10/1990 | |
|---|---|---|---|---|
| JP | 7-67209 | A | 3/1995 | |
| JP | 11-223140 | A | 8/1999 | |
| JP | 2001-57709 | A | 2/2001 | |
| JP | 2001-115871 | | 4/2001 | |
| JP | 2002-180871 | A | 6/2002 | |
| JP | 2003-9305 | A | 1/2003 | |
| JP | 2005-90339 | | 4/2005 | |
| JP | 2006-125245 | A | 5/2006 | |
| JP | 2007278074 | A * | 10/2007 | ............ 123/339.14 |
| JP | 2008051046 | A * | 3/2008 | ................ 477/111 |
| JP | 2008-280926 | A | 11/2008 | |

* cited by examiner

*Primary Examiner* — Willis R Wolfe, Jr.
(74) *Attorney, Agent, or Firm* — Oblon, Spivak, McClelland, Maier & Neustadt, L.L.P.

(57) ABSTRACT

A vehicle control apparatus includes: an accessory that adjusts torque that is output from an internal combustion engine, by giving load to the internal combustion engine; an ignition timing control portion that is provided so as to adjust ignition timing of the internal combustion engine, and that adjusts the torque output from the internal combustion engine by performing a retardation control of the ignition timing; an accessory load adjustment portion that adjusts an accessory load that is the load given from the accessory to the internal combustion engine; and a catalyst that purifies exhaust gas discharged from the internal combustion engine. The ignition timing control portion reduces the retardation of the ignition timing with increase in temperature of the catalyst. The accessory load adjustment portion increases the accessory load with increase in the temperature of the catalyst.

18 Claims, 10 Drawing Sheets

VEHICLE CONTROL APPARATUS

INCORPORATION BY REFERENCE

The disclosure of Japanese Patent Application No. 2009-163128 filed on Jul. 9, 2009 including the specification, drawings and abstract is incorporated herein by reference in its entirety.

BACKGROUND OF THE INVENTION

1. Field of the Invention

The invention relates to a vehicle control apparatus. In particular, this invention relates to a vehicle control apparatus that controls the torque output from an internal combustion engine provided as a motive power source for the travelling of the vehicle, by using the load that acts on the internal combustion engine when an alternator provided for the internal combustion engine generates electricity.

2. Description of the Related Art

In more and more cases, vehicles use internal combustion engines as their motive power sources. When the output from the engine of a vehicle is to be controlled while the vehicle is traveling, the engine output is controlled by adjusting the degree of opening of a throttle valve that adjusts the amount of air taken into the engine. However, since even air is subject to inertia, the intake air amount tends not to immediately change when the degree of opening of the throttle valve is adjusted but to change after a delay following the adjustment of the degree of opening of the throttle valve. Therefore, the actual output of the engine produced when the degree of opening of the throttle valve is adjusted by a driver operating the accelerator pedal, or through an electronic control of the throttle valve, sometimes changes after a delay following change in the degree of opening of the throttle valve.

If the control of the intake air amount is the only control that is used, the actual change in the output of the engine sometimes has a delay in response to change in the degree of opening of the throttle valve. Therefore, in a related-art vehicle control apparatus, the control of the output of engine is supplemented by controlling the amount of electricity generation of an alternator that generates electricity by using torque that is produced as the crankshaft of the engine rotates. That is, since the alternator generates electricity by using torque generated by the engine, the electricity generation of the alternator involves load being given from the alternator to the engine, which can be seen from the viewpoint of the flowing or transmission of force from the alternator to the engine. Therefore, since part of the motive power generated by combustion of fuel in the engine is used for the electricity generation of the alternator, the control of the output of the engine is supplemented by changing the load to the engine through the control of the amount of electricity generation of the alternator in some control apparatuses.

For example, in a control apparatus for an internal combustion engine described in Japanese Patent Application Publication No. 2001-115871 (JP-A-2001-115871), an idling operation of the engine is appropriately controlled by controlling the load to the engine from an alternator that generates electricity by using part of the motive power of the engine, and also controlling the intake air amount of the engine, during the idling operation of the engine. Furthermore, a control apparatus for an internal combustion engine described in Japanese Patent Application Publication No. 2001-115871 (JP-A-2001-115871) is provided with abnormality detection means for detecting abnormality of an alternator, and stops a control of the load from the alternator to the engine if abnormality of the alternator is detected. This substantially avoids the failure to appropriately perform the idling operation of the engine which results from the controlling of the alternator that is performed during an abnormal state of the alternator.

Besides, in an electricity generation amount control apparatus for an electricity generator for a vehicle described in Japanese Patent Application Publication No. 2005-90339 (JP-A-2005-90339), when the speed change ratio of the automatic transmission is to be shifted, the shift shock is reduced by executing a retardation control of the ignition timing of the engine, and when the engine is in a state of low temperature that is equal to or lower than a predetermined temperature, the shift shock is reduced by increasing the amount of electricity generation through prohibition of the ignition timing retardation control, and therefore increasing the load torque provided by the alternator. That is, during the ordinary travelling of the vehicle, the shift shock is reduced by the retardation control of the ignition timing. During the low temperature state where there arises concern for combustion deterioration, the output of the engine that is substantially transmitted from the engine to the automatic transmission is reduced. This restrains the shift shock when the speed change ratio of the automatic transmission is shifted, while restraining deterioration of emissions.

Thus, in the case where the output of the engine is controlled, a more appropriate control can be performed by using not only the control of the degree of opening of the throttle valve but also the control of the load torque of the alternator. However, in the case where the degree of opening of the throttle valve is controlled or the load torque of the alternator is changed according to the torque demanded of the engine, it sometimes happens that not only the output of the engine but also other states of the vehicle are influenced. Therefore, in the case where the output of the engine is controlled by performing a coordinated control combining the control of the load torque of the alternator and another control, there is a need not to perform the control on the basis of only the output of the engine but to appropriately perform the control by taking into account other conditions as well.

SUMMARY OF THE INVENTION

The invention has been accomplished in view of the foregoing circumstances, and provides a vehicle control apparatus that is able to more appropriately perform a coordinated control combining a control of the load torque of an alternator that is performed for controlling the output of the engine and another control.

According to one aspect of the invention, there is provided a vehicle control apparatus that includes an accessory that adjusts torque that is output from an internal combustion engine, by giving load to the internal combustion engine, and that also includes: an ignition timing control portion that is provided so as to adjust ignition timing of the internal combustion engine, and that adjusts the torque output from the internal combustion engine by performing a retardation control of the ignition timing; an accessory load adjustment portion that adjusts an accessory load that is the load given from the accessory to the internal combustion engine; and a catalyst that purifies exhaust gas discharged from the internal combustion engine, wherein the ignition timing control portion reduces the retardation of the ignition timing with increase in temperature of the catalyst, and the accessory load adjustment portion increases the accessory load with increase in the temperature of the catalyst.

Besides, according to another aspect of the invention, there is provided a vehicle control apparatus that includes: an accessory that is provided so as to generate electricity by using torque generated by an internal combustion engine, and that adjusts the torque output from the internal combustion engine by adjusting magnitude of load given to the internal combustion engine while the accessory is generating electricity; and an electricity storage device that stores electricity generated by the accessory, and that also includes: an ignition timing control portion that is provided so as to control ignition timing of the internal combustion engine, and that adjusts the torque output from the internal combustion engine by performing a retardation control of the ignition timing; and an accessory load adjustment portion that adjusts an accessory load that is the load given from the accessory to the internal combustion engine, wherein the ignition timing control portion reduces the retardation of the ignition timing with decrease in amount of stored electricity of the electricity storage device, and the accessory load adjustment portion increases the accessory load with decrease in the amount of stored electricity of the electricity storage device.

Besides, according to still another aspect of the invention, there is provided a vehicle control apparatus that includes an accessory that adjusts torque that, is output from an internal combustion engine, by giving load to the internal combustion engine, and that also includes: an ignition timing control portion that is provided so as to control ignition timing of the internal combustion engine, and that adjusts the torque output from the internal combustion engine by performing a retardation control of the ignition timing; and an accessory load adjustment portion that adjusts an accessory load that is the load given from the accessory to the internal combustion engine, wherein the accessory load adjustment portion increases the accessory load if the ignition timing reaches a misfire limit as the ignition timing control portion performs the retardation control.

The foregoing vehicle control apparatus may further include an intake air amount adjustment means for adjusting intake air amount when the internal combustion engine is operating, and the accessory load adjustment portion may increase amount of adjustment of the accessory load if load of the intake air amount adjustment means becomes greater than or equal to a predetermined load.

Besides, the foregoing vehicle control apparatus may further include: a speed ratio shift apparatus that changes the torque output from the internal combustion engine at a desired speed change ratio, and outputs the torque to a driving wheel-side; and a speed ratio shift control portion that performs a speed ratio shift control of the speed ratio shift apparatus, and when drive force generated by the driving wheel is to be increased, the accessory load adjustment portion may reduce the accessory load provided that the torque output from the internal combustion engine becomes equal to a predetermined torque, and the speed ratio shift control portion may postpone shift timing to a timing that is later than a timing of changing the speed change ratio of the speed ratio shift apparatus which is set when the accessory load is not reduced.

Besides, the vehicle control apparatus may further include an intake air amount adjustment means for adjusting intake air amount when the internal combustion engine is operating, and the accessory load adjustment portion may increase amount of adjustment of the accessory load if a demand for adjustment of the torque exceeds a range that is achievable through adjustment of the intake air amount by the intake air amount adjustment means.

Besides, in the vehicle control apparatus, the accessory may be provided so as to generate electricity by using torque generated by the internal combustion engine, and so as to adjust the torque output from the internal combustion engine by adjusting magnitude of load given to the internal combustion engine while the accessory is generating electricity, and the accessory load adjustment portion may increase amount of electricity generation of the accessory with decrease in temperature of an electricity storage device that stores electricity generated by the accessory.

Besides, in the vehicle control apparatus, the accessory may be provided so as to generate electricity by using torque generated by the internal combustion engine, and so as to adjust the torque output from the internal combustion engine by adjusting magnitude of the accessory load by changing amount of electricity generation of the accessory while the accessory is generating electricity, and the accessory load adjustment portion may be provided so as to adjusts the accessory load by controlling the amount of electricity generation of the accessory when the accessory generates electricity, and the accessory load adjustment portion may reduce the accessory load with decrease in electric power consumption if a torque equal in magnitude to a demanded torque that is to be output from the internal combustion engine is able to be output from the internal combustion engine by reducing the accessory load, and the accessory load adjustment portion may increase the accessory load if the demanded torque decreases while the accessory load has been reduced.

The vehicle control apparatuses as described above achieve an effect of more appropriately performing a coordinated control combining a control of the load torque of the alternator that is performed for controlling the output of the engine, and another control.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Hereinafter, embodiments of the vehicle control apparatus of the invention will be described in detail. Incidentally, the embodiments do not limit the invention. Besides, component elements of the embodiments include component elements with which a person having ordinary skill in the art can easily replace elements shown below, or which are substantially the same as elements shown below.

Figure 1:
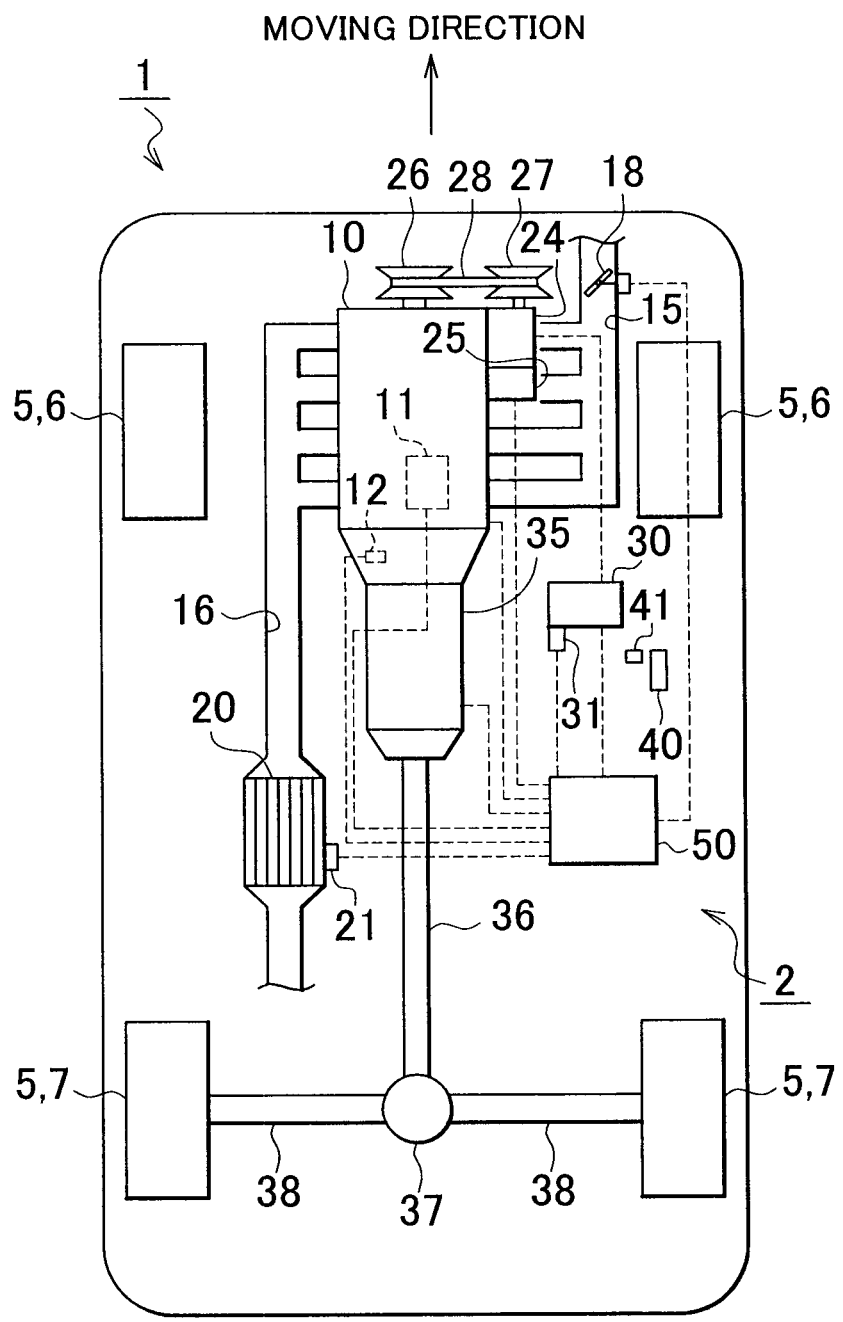
FIG. 1 is a schematic diagram of a vehicle provided with a vehicle control apparatus in accordance with a first embodiment of the invention.

FIG. 1 is a schematic diagram of a vehicle provided with a vehicle control apparatus in accordance with a first embodiment of the invention. In a vehicle 1 equipped with a vehicle control apparatus 2 in accordance with the first embodiment, an engine 1 that is an internal combustion engine is provided as a motive power source for the traveling of the vehicle 1. The vehicle 1 is able to travel as the motive power generated by the engine 10 is transferred, via an automatic transmission 35, to rear wheels 7 that are provided as driving wheels, among wheels 5 that the vehicle 1 has. Among these components of the vehicle 1, the automatic transmission 35 is provided as a speed ratio shift apparatus that has a plurality of shift speeds of different speed change ratios, and that, by shifting the shift speed, is able to change the torque from the engine 10 at a desired speed change ratio and output the thus-changed torque to the driving wheel-side.

Besides, the rotation speed and the torque of the engine 10 are controlled by an ECU (electronic control unit) 50 that controls various portions of the vehicle 1. The thus-provided engine 10 is a spark ignition internal combustion engine that has a plurality of cylinders that each have an ignition plug (not shown), and that is able to ignite a mixture of fuel and air within a combustion chamber (not shown) of each cylinder, by a spark generated when the ignition plug of the cylinder is discharged. Therefore, the engine 10 is provided with an ignition circuit 11, and the ignition plugs are able to discharge due to current applied thereto from the ignition circuit 11.

The engine 10 as a motive power source is mounted in a forward-side portion of the vehicle 1 in the traveling direction of the vehicle 1, and drives the rear wheels 7 via the automatic transmission 35, a propeller shaft 36, a differential gear 37, and drive shafts 38. While the rear wheels 7 are thus provided as driving wheels, front wheels 6 are steer wheels that are provided so as to be steerable by a driver's operation of a steering handle. Thus, the vehicle 1 equipped with the vehicle control apparatus 2 in accordance with the first embodiment is of a so-called FR (front engine, rear drive) type vehicle in which the engine 10 is mounted in a front portion of the vehicle 1 in the traveling direction of the vehicle 1 and the rear wheels 7 are provided as the driving wheels. Incidentally, the vehicle control apparatus 2 in accordance with the first embodiment is applicable to any vehicle 1 regardless of the type of engine mount and driving, as long as motive power generated by a motive power source of the vehicle 1 is transferred to the driving wheels.

The engine 10, provided so as to be able to operate by burning fuel in the combustion chambers, is connected to an intake passageway 15 that is a passageway of air through which air for burning fuel is taken into the combustion chambers, and to an exhaust passageway 16 that is a passageway of exhaust gas that is discharged from the combustion chambers after fuel is burned. The intake passageway 15 is provided with a throttle valve 18 that is intake air amount adjustment means for adjusting the amount of air taken in during operation of the engine 10, and fuel injectors (not shown) that inject fuel to be supplied into the combustion chambers. Besides, the exhaust passageway 16 is provided with a catalyst 20 that is purification means for purifying the exhaust gas that flows through the exhaust passageway 16. Furthermore, the exhaust passageway 16 is provided with a catalyst temperature sensor 21 that is catalyst temperature detection means for detecting the temperature of the catalyst 20.

Besides, the engine 10 is provided with an engine rotation speed sensor 12 that is engine rotation speed detection means for detecting the rotation speed of a crankshaft (not shown) that is a rotation shaft that is rotated by the combustion energy of fuel. The engine rotation speed sensor 12, the throttle valve 18, the catalyst temperature sensor 21 are connected to the ECU 50, and the ignition circuit 11 is also connected to the ECU 50.

Besides, the engine 10 is equipped with an alternator 24 that is able to generate electricity for various electrical component parts provided in the vehicle 1, by using torque that the engine 10 generates. This alternator 24 is provided with an alternator pulley 27 that is provided on a rotation shaft of the alternator 24 and that is rotatable integrally with the rotation shaft. Besides, the engine 10 is provided with a crank pulley 26 that is rotatable integrally with the crankshaft.

A belt 28 that transfers torque from the engine 10 to the alternator 24 is wrapped around the alternator pulley 27 and the crank pulley 26. This belt 28 is a so-called V belt which has the shape of a loop, and whose width gradually reduces from the outer side toward the inner side of the loop shape. Incidentally, the belt 28 may also be a belt other than the V belt; for example, a V rib belt whose inner side of the loop shape has a plurality of grooves that are formed in the circumferential direction may be used.

The torque generated by the engine 10 is able to be transferred to the alternator 24 via the crank pulley 26, the belt 28 and the alternator pulley 27. The alternator 24 consumes part of the motive power generated by the engine 10, as the alternator 24 generates electricity by using torque generated by the engine 10. Therefore, in other words, while the alternator 24 is generating electricity, the alternator 24 gives load torque to the engine 10. The alternator 24 is provided as an accessory that gives load torque to the engine 10 in this manner. Besides, the load torque given from the alternator 24 to the engine 10 is an alternator load that is an accessory load.

Besides, the alternator 24 is provided with a known regulator 25 that is electricity generation adjustment means for adjusting the amount of electricity generated during the electricity generation performed by the alternator 24. The alternator 24, which is provided so that the electricity generation amount is adjustable by the regulator 25, is able to give load to the engine 10 when the alternator 24 performs electricity generation as described above. Therefore, when the amount of electricity generated by the alternator 24 is changed by adjusting the electricity generation amount via the regulator 25, the load given from the alternator 24 to the engine 10 also changes. That is, the alternator 24 is able to adjust the magnitude of the alternator load that is given to the engine 10, through adjustment of the electricity generation amount of the alternator 24.

A battery 30 that is an electricity storage device capable of storing electricity that is generated by the alternator 24 is connected to the alternator 24. This battery 30 is provided as a secondary cell capable of being charged and discharged. The electricity changed into the battery 30 is used by various electrical component parts that are provided in the vehicle 1. Besides, the battery 30 is provided with a battery temperature sensor 31 that is electricity storage device temperature detection means for detecting the temperature of the battery 30. The regulator 25, the battery 30 and the battery temperature sensor 31 are connected to the ECU 50.

Besides, an accelerator pedal 40 that is an output adjustment portion capable of adjusting the rotation speed of the engine 10 and the torque generated by the engine 10 by adjusting the amount of operation (depression) of the pedal 40 is provided in the vicinity of a driver's seat of the vehicle 1. An accelerator operation amount sensor 41 that is output adjustment portion's operation amount detection means for detecting the accelerator operation amount that is the amount of operation of the accelerator pedal 40 is provided in the vicinity of the accelerator pedal 40. This accelerator operation amount sensor 41 is also connected to the ECU 50.

Figure 2:
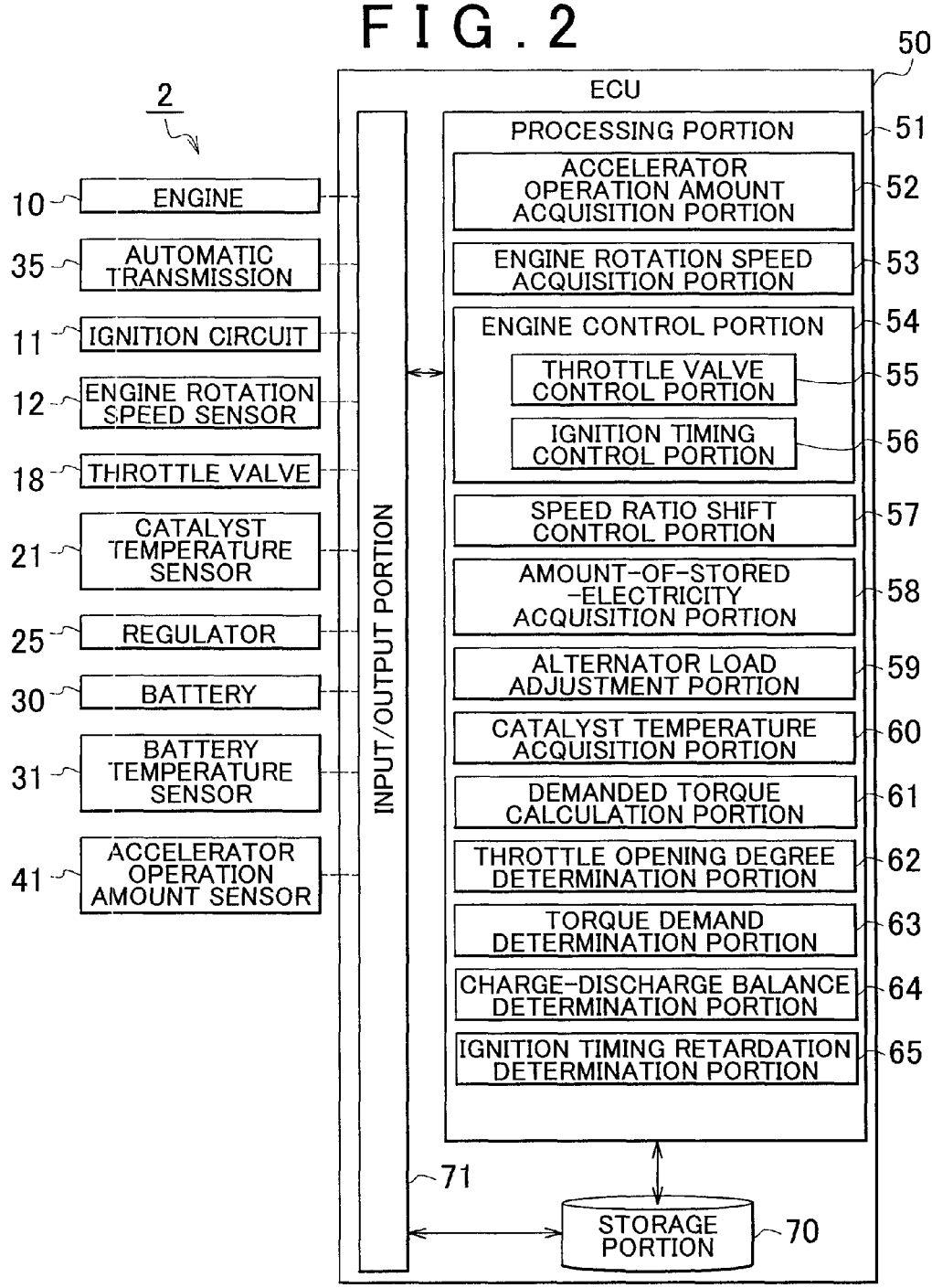
FIG. 2 is a construction diagram of portions of the vehicle control apparatus shown in FIG. 1.

FIG. 2 is a construction diagram of portions of the vehicle control apparatus shown in FIG. 1. The ECU 50 is provided with a processing portion 51, a storage portion 70 and an input/output portion 71. These portions are interconnected, and are capable of delivering signals to and receiving signals from each other. Besides, the engine 10, the automatic transmission 35, the ignition circuit 11, the engine rotation speed sensor 12, the throttle valve 18, the catalyst temperature sensor 21, the regulator 25, the battery 30, the battery temperature sensor 31 and the accelerator operation amount sensor 41 which are connected to the ECU 50 are connected to the input/output portion 71. The input/output portion 71 inputs signals from and outputs signals to these components, including the engine 10 and the like. Besides, the storage portion 70 stores computer programs that control the vehicle control apparatus 2.

Besides, the processing portion 51 is constructed of a memory and a CPU (central processing unit), and has at least an accelerator operation amount acquisition portion 52 capable of acquiring the accelerator operation amount that is the amount of operation of the accelerator pedal 40 from a result of the detection performed by the accelerator operation amount sensor 41, an engine rotation speed acquisition portion that acquires the engine rotation speed from a result of the detection performed by the engine rotation speed sensor 12, and an engine control portion 54 that performs the operation control of the engine.

Among these components, the engine control portion 54 has a throttle valve control portion 55 that controls the opening and closing of the throttle valve 18 that is provided in the intake passageway 15, and an ignition timing control portion 56 that controls the timing of the ignition performed by the ignition plugs by controlling the ignition circuit 11.

Besides, the processing portion 51 has a speed ratio shift control portion 57 that performs a speed ratio shift control of the automatic transmission 35; an amount-of-stored-electricity acquisition portion 58 that acquires the amount of electricity stored in the battery 30; an alternator load adjustment portion 59 that is an accessory load adjustment portion that adjusts the magnitude of the alternator load that is the load given from the alternator 24 to the engine 10, by controlling the amount of electricity generated by the alternator 24; the catalyst temperature acquisition portion 60 that acquires the temperature of the catalyst from a result of the detection performed by the catalyst temperature sensor 21; a demanded torque calculation portion 61 that calculates a demanded torque that is a torque demanded of the engine 10 during operation of the engine 10; a throttle opening degree determination portion 62 that determines whether or not the demanded torque can be achieved by adjusting only the opening-closing control of the throttle valve 18; a torque demand determination portion 63 that determines whether or not the demanded torque is a demand of torque increase or a demand of torque decrease; a charge-discharge balance determination portion 64 that determines whether or not the charge-discharge balance of the battery 30 has any problem; and an ignition timing retardation determination portion 65 that determines whether or not the ignition timing is an ignition timing is so retarded as to cause a misfire.

The vehicle control apparatus 2 controlled by the ECU 50 is controlled by, for example, the processing portion 51 loading a computer program as mentioned above into a memory incorporated in the processing portion 51, and performing computation on the basis of detection results from the catalyst temperature sensor 21 or the like, and then actuating the regulator 25 or the like according to a result of the computation. At that time, the processing portion 51 stores numerical values that are provided intermediately in the computation into the storage portion 70 as appropriate, and extracts the stored numerical values to execute the computation. Incidentally, in the case where the vehicle control apparatus 2 is controlled in this manner, the control may be performed by a dedicated hardware device other than the ECU 50, instead of the computer program.

The vehicle control apparatus 2 in accordance with the first embodiment is constructed as described above, and operation of the vehicle control apparatus 2 will be described below. At the time of travel of the vehicle 1, the vehicle control apparatus 2 detects the accelerator operation amount that is the amount of operation of the accelerator pedal 40 that is operated by a driver, via the accelerator operation amount sensor 41 that is provided in the vicinity of the accelerator pedal 40, and acquires results of this detection via the accelerator operation amount acquisition portion 52 provided in the processing portion 51 of the ECU 50. The accelerator operation amount acquired by the accelerator operation amount acquisition portion 52 is transferred to the engine control portion 54 that is provided in the processing portion 51 of the ECU 50. On the basis of the transferred accelerator operation amount, various portions of the engine 10 are controlled by the engine control portion 54 so as to control the output of the engine 10.

Concretely, the rotation speed and the torque of the engine 10 are controlled, for example, by adjusting the amount of fuel injected from the fuel injector, by adjusting the degree of opening of the throttle valve 18 via the throttle valve control portion 55 provided in the engine control portion 54, or by controlling the ignition timing of the ignition plugs through the control of the ignition circuit 11 by the ignition timing control portion 56 provided in the engine control portion 54. That is, when the state of operation of the engine 10 is to be controlled, the torque output from the engine 10 is adjusted by adjusting the amount of mixture of fuel and air that is to be burned in each combustion chamber and the mixture ratio between fuel and air through adjustment of the degree of opening of the throttle valve 18 and adjustment of the amount of fuel injection, or by adjusting the state of combustion through adjustment of the ignition timing.

Besides, in the case where the torque output from the engine 10 is adjusted by adjusting the degree of opening of the throttle valve 18 as described above, the torque of the engine 10 is changed by changing the degree of opening of the throttle valve 18 to change the intake air amount and changing the amount of fuel injection according to changes in the intake air amount. In this process, the intake air amount does not change immediately after the degree of opening of the throttle valve 18 changes. That is, the intake air amount changes after a delay time following change in the degree of opening of the throttle valve 18. Therefore, the torque of the engine 10 also changes after a delay following change in the degree of opening of the throttle valve 18.

Because of this, when the torque of the engine 10 is to be sharply changed, the ignition timing is also controlled. For example, when the torque is to be decreased, the efficiency of using energy produced by the combustion as torque is reduced by retarding the ignition timing via the ignition timing control portion 56 provided in the engine control portion 54. Therefore, the torque output from the engine 10 is reduced in an early period after the control of decreasing the torque is started.

The engine 10 is capable of being operated in a desired state of operation by controlling portions of the engine 10 that are objects of controls performed by the engine control portion 54. During operation of the engine 10, exhaust gas formed after fuel is burned in the combustion chambers flows into the exhaust passageway 16. Since the exhaust passageway 16 is provided with the catalyst 20, the exhaust gas that flows through the exhaust passageway 16 is purified by the catalyst 20. The exhaust gas purified by the catalyst 20 is then subjected to a reduction of sound volume that is achieved by reducing the pressure in a silencer device (not shown) that is provided on the exhaust passageway 16. After that, the exhaust gas is released into the atmosphere.

Besides, the speed ratio shift control portion 57 provided in the processing portion 51 of the ECU 50 performs the ratio shift control of the automatic transmission 35 so as to achieve a shift speed that is suitable to the driver's demanded drive force or vehicle speed, on the basis of the accelerator operation amount, a detection result from a vehicle speed sensor (not shown) that detects the vehicle speed during travel, etc. Thus, the output of the engine 10 controlled by the engine control portion 54 is transferred to the automatic transmission 35, whereby the output of the engine 10 is changed in speed at a speed change ratio that is suitable to the traveling state of the vehicle 1. After that, the output of the automatic transmission 35 is transferred to the rear wheels 7 via the propeller shaft 36, the differential gear 37 and the drive shafts 38. Due to this, the rear wheels 7, which are the driving wheels, are rotated, so that the vehicle 1 travels at a speed commensurate with the accelerator operation amount.

Besides, during operation of the engine 10, a part of the torque generated by the engine 10 is transferred to the alternator 24 via the crank pulley 26, the belt 28, and the alternator pulley 27. Therefore, the alternator 24 is driven to generate electricity. The electricity generated by the alternator 24 is transferred from the alternator 24 to the battery 30, and is charged into the battery 30.

When the alternator 24, which generates electricity by using torque generated by the engine 10, performs electricity generation, the amount of electricity generation of the alternator 24 is controlled by controlling the regulator 25 via the alternator load adjustment portion 59 provided in the processing portion 51 of the ECU 50. For example, the amount of electricity stored in the battery 30 is acquired by the amount-of-stored-electricity acquisition portion 58 provided in the processing portion 51 of the ECU 50. If the acquired amount of electricity stored is small, the amount of electricity generated by the alternator 24 is increased by controlling the regulator 25 via the alternator load adjustment portion 59. Therefore, the amount of electricity transferred to the battery 30 is increased, so that the amount of electricity stored in the battery 30 is increased. On the other hand, in the case where the amount of electricity stored in the battery 30 which is acquired by the amount-of-stored-electricity acquisition portion 58 is large, the amount of electricity generated by the alternator 24 is reduced by controlling the regulator 25 via the alternator load adjustment portion 59. Therefore, the electricity transferred to the battery 30 is reduced, so that the amount of electricity stored in the battery 30 is prevented from becoming excessively large.

Since a part of the torque generated by the engine 10 is used to perform electricity generation by the alternator 24, the amount of torque used for electricity generation is consumed, and the amount of torque for use for the vehicle driving force correspondingly decreases. In other words, during electricity generation by the alternator 24, load is given from the alternator 24 to the engine 10.

Besides, this load becomes larger the larger the amount of electricity generated by the alternator 24, and becomes smaller the smaller the amount of electricity generated by the alternator 24. The alternator 24 is constructed so that the amount of electricity generation can be controlled by controlling the regulator 25 via the alternator load adjustment portion 59. Due to this, when the amount of electricity generation is changed by controlling the regulator 25 via the alternator load adjustment portion 59, the load given from the alternator 24 to the engine 10 changes. The alternator load adjustment portion 59 is capable of adjusting the alternator load that is the load given from the alternator 24 to the engine 10, by adjusting the amount of electricity generated by the alternator 24.

Since the alternator load is given to the engine 10 when electricity generation is performed by the alternator 24, the torque transferred from the engine 10 to the automatic transmission 35 changes according to the magnitude of the alternator load during the electricity generation. That is, in the case where the amount of electricity generation of the alternator 24 is increased by controlling the regulator 25, the alternator load becomes larger, so that, of the torque generated by the engine 10, the amount of electricity consumed by the alternator load increases, and therefore the torque transferred from the engine 10 to the automatic transmission 35 becomes smaller. On the other hand, in the case where the amount of electricity generation of the alternator 24 is decreased by controlling the regulator 25, the alternator load becomes smaller, so that, of the torque generated by the engine 10, the amount of torque consumed by the alternator load decreases and the torque transferred from the engine 10 to the automatic transmission 35 becomes larger.

During operation of the engine 10, the rotation speed or the torque of the engine 10 is controlled by controlling the degree of opening of the throttle valve 18 or the ignition timing as described above. Thus, the torque transferred from the engine 10 to the automatic transmission 35 can also be adjusted by adjusting the amount of electricity generation of the alternator 24 via the alternator load adjustment portion 59, and therefore adjusting the alternator load. Therefore, in the vehicle control apparatus 2 in accordance with the first embodiment, in the case where the torque output from the engine 10 is to be controlled, the torque generated by the engine 10 is controlled by adjusting the degree of opening of the throttle valve 18, the amount of fuel injection, and the ignition timing, and in addition, the torque transferred from the engine 10 to the automatic transmission 35 is adjusted by adjusting the alternator load.

Therefore, in the case where, during travel of the vehicle 1 during which the torque output from the engine 10 can be adjusted, the demanded torque at the time of a transitional demand for torque increase or torque decrease during a period from the start to the end of a speed ratio shift operation of the automatic transmission 35 cannot be achieved by employing only the control of the degree of opening of the throttle valve 18, the torque output from the engine 10 is made substantially equal to the demanded torque by performing the control of retarding the ignition timing or the control of the alternator load. That is, in the case where the demanded torque cannot be achieved by employing only the control of the degree of opening of the throttle valve 18, a coordinated control combining the retardation control of the ignition timing and the control of the alternator load is performed to achieve the demanded torque.

Although the torque output from the engine 10 is controlled by performing the retardation control of the ignition timing, the ignition timing retardation is restricted in the case where the temperature of the cooling water of the engine 10 during operation of the engine 10 is low, or the case where the voltage of the battery 30 is low. That is, in the case where the temperature of the cooling water is low, the combustion of fuel in the combustion chambers becomes difficult, and therefore misfire becomes likely to occur. Besides, in the case where the voltage of the battery 30 is low, the sparks produced from the ignition plugs for ignition become small, so that if the amount of retardation of the ignition timing is made large, misfire becomes likely to occur. Therefore, in these cases, the retardation control of the ignition timing is restricted so that the settable range of the amount of retardation becomes small. Therefore, in these cases, torque compensation is performed by performing a coordinated control combining the retardation control of the ignition timing and the control of the alternator load.

Besides, in the case where the torque output from the engine is controlled during acceleration of the vehicle 1, the torque control is performed by performing the ignition timing retardation control in accordance with the vehicle resonance and fluctuations of the engine rotation speed, in order to reduce the shock that occurs during acceleration. In this case, too, the ignition timing retardation is restricted if the temperature of the cooling water is low, or is restricted depending on the magnitude of the control amount of the ignition timing retardation control, or the length of time of the ignition timing retardation control. For example, in the case where the ignition timing is retarded, the temperature of the catalyst 20 is likely to rise; therefore, in order to restrain the temperature rise of the catalyst 20, the duration of performance of the ignition timing retardation control is restricted. Therefore, in the case where the retardation control of the ignition timing is restricted during acceleration of the vehicle 1, too, the torque compensation is performed by performing a coordinated control combining the retardation control of the ignition timing and the control of the alternator load.

Besides, in the case where the ratio of the automatic transmission 35 is shifted down by a manual downshift that is performed not by the speed ratio shift control portion 57 of the processing portion 5 of the ECU 50 controlling the shift according to the state of travel of the vehicle 1, but by a driver selecting a shift speed by operating the selector lever (not shown) or the like that is provided at a driver's seat of the vehicle 1, the torque control is performed by the ignition timing retardation control. For this torque control, the alternator load is also used. That is, in the case where a manual downshift is to be performed, the torque increase for the downshift is required to have good accuracy and quick response. Therefore, in a technique for realizing this, the degree of throttle opening is made greater beforehand, and the torque increase to be achieved by the increased degree of throttle opening is restrained by retarding the ignition timing, and then the torque is increased at the timing of increasing the torque by advancing the ignition timing.

In the case where the ignition timing is retarded, the fuel economy may deteriorate or the emission characteristic may decline. However, when a torque increase is performed at the time of a manual downshift, the control of the alternator load is employed as well as the retarding control of the ignition timing, and a coordinated control combining these controls is performed so that the deterioration of the fuel economy and the decline of the emission characteristic can be restrained. Therefore, when a manual downshift is performed, it is possible to perform the torque increase with high accuracy and quick response, while restraining the deterioration of fuel economy and the decline of the emission characteristic.

Besides, for the purpose of reducing the shock that is caused as the engine torque is suddenly transferred to the driving wheels when the position of the selector lever or the like is switched from a so-called neutral to the drive range, the torque is reduced temporarily by performing the torque control through the ignition timing retardation control, and then the torque increase is performed. For the torque control in this case, too, the retardation control of the ignition timing and the control of the alternator load are employed in coordination. Therefore, it is possible to reduce the shock that occurs when the state of the automatic transmission 35 is switched from the neutral state to a state in which torque of the engine can be transferred to the driving wheels, while restraining the deterioration of the fuel economy and the decline of the emission characteristic.

Besides, in the case where the rotation speed of the engine 10 sharply changes, there sometimes occurs a transitional knock that is a knocking caused by the combustion becoming unstable. When the transitional knock is to be prevented, the ignition timing is retarded, and in this case, too, the ignition timing retardation can be restricted. Besides, when knocking has occurred, the knocking is removed by retarding the ignition timing. However, in this case, the ignition timing is greatly retarded, so that torque fluctuates in association with the retardation of the timing. Thus, the coordinated control combining the retardation control of the ignition timing and the control of the alternator load is performed also in the case where the retardation of the ignition timing is restricted due to the retardation of the ignition timing performed for the purpose of preventing the transitional knock, or the case where the torque fluctuation caused by the retardation of the ignition timing that is performed in order to remove the knocking that occurs is to be reduced. Therefore, it is possible to supplement the torque control with the control of the alternator load in the case where the retardation of the ignition timing is restricted, or restrain the torque fluctuation caused by the retardation control of the ignition timing that is performed when knocking occurs.

Besides, in the case where the temperature the catalyst 20 is lower, the efficiency in purifying exhaust gas is low. Therefore, in that case, the following control is performed. That is, the amount of exhaust gas is increased by increasing the amount of intake air, so that the amount of exhaust gas flowing to the catalyst 20 is increased, whereby the temperature of the catalyst 20 is raised in short time. In the case where the intake air amount is increased in this manner, the torque generated by the engine 10 becomes larger with increases of the intake air amount. Because of this, in the case where the torque generated by the engine 10 is larger than the demanded torque, the generated torque is reduced to the demanded torque by performing the ignition timing retardation control. However, if the ignition timing is retarded, the fuel combustion state becomes likely to deteriorate. Besides, if the ignition timing is retarded, the temperature of exhaust gas is likely to become high, and therefore the catalyst 20 becomes likely to degrade. Because of this, in the case where extraneous torque increase during the warm-up of the catalyst is to be restrained, the amount of retardation of the ignition timing is reduced by increasing the alternator load, so that the deterioration of emissions associated with deterioration of the combustion state and the degradation of the catalyst caused by the flowing of high-temperature exhaust gas are restrained while the extraneous torque increase is restrained.

In some cases, when the torque of the engine 1 is to be changed by changing the degree of throttle opening, the response of the actual change in the torque to changes in the demanded torque is virtually quickened by derivative compensation. In such cases, the response can be also quickened by utilizing the alternator load instead.

Figure 3:
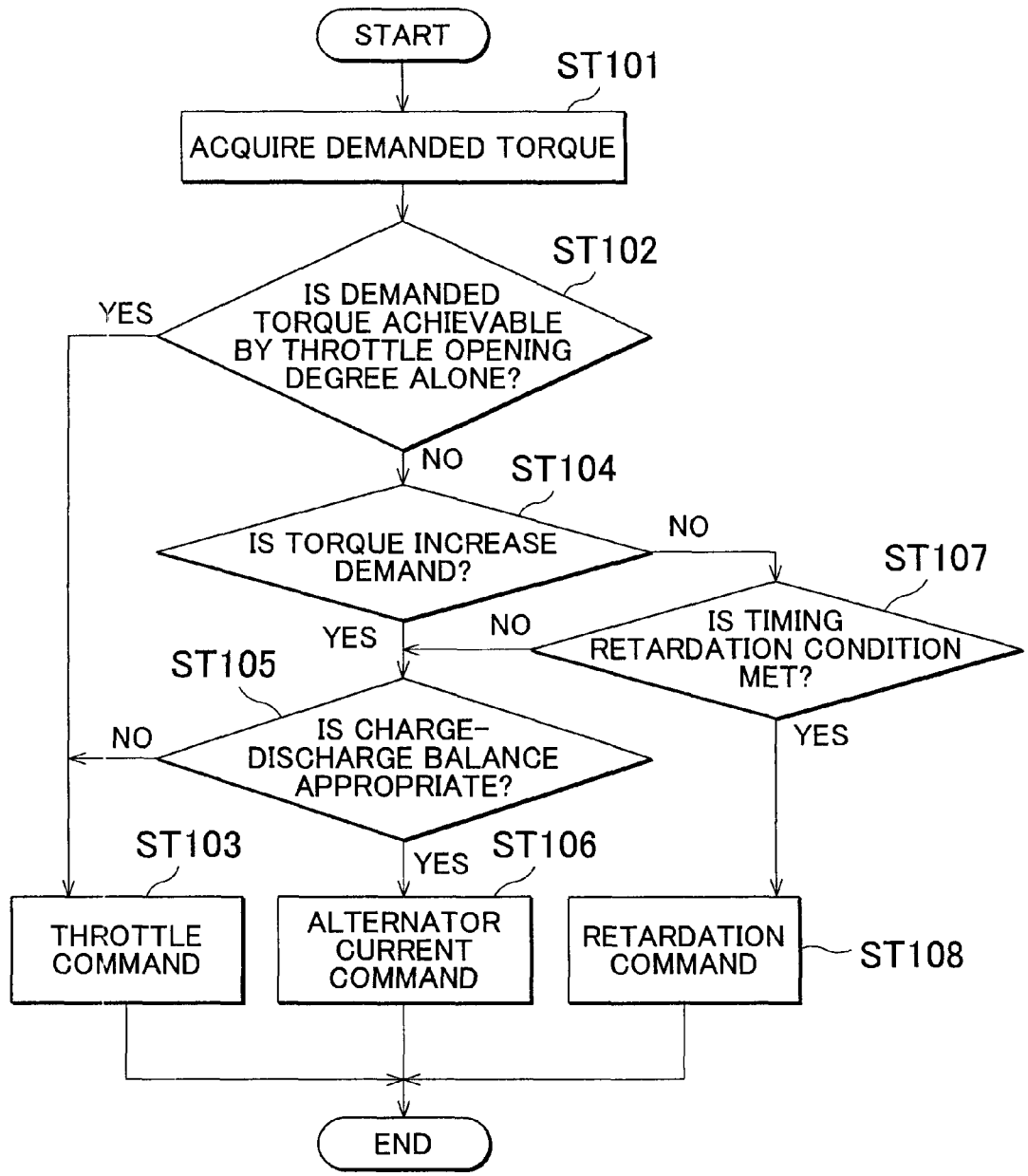
FIG. 3 is a flowchart showing a general construction of a processing procedure of the vehicle control apparatus in accordance with the first embodiment.

FIG. 3 is a flowchart showing a general construction of a processing procedure of the vehicle control apparatus in accordance with the first embodiment of the invention. Now, a general construction of a control method of the vehicle control apparatus 2 in accordance with the first embodiment, that is, a general construction of a processing procedure of the vehicle control apparatus 2, will be described. Incidentally, the process described below is a processing procedure performed when the demanded torque is to be realized by using the control of the degree of throttle opening, the control of the alternator load, or the retardation control of the ignition timing. The process is called up at every predetermined period, when various portions are to be controlled during operation of the vehicle 1. In the processing procedure of the vehicle control apparatus 2 in accordance with the first embodiment, a demanded torque is firstly acquired (step ST101). This calculation is performed by the demanded torque calculation portion 61 that is provided in the processing portion 51 of the ECU 50. The demanded torque calculation portion 61 calculates a demanded torque that is a torque that the driver demands the engine 10 to produce, on the basis of the accelerator operation amount and the engine rotation speed. Among these factors, the accelerator operation amount is obtained by detecting the degree of opening of the accelerator pedal 40 via the accelerator operation amount sensor 41, and by acquiring results of the detection via the accelerator operation amount acquisition portion 52 of the processing portion 51 of the ECU 50. Besides, the engine rotation speed is obtained by detecting the engine rotation speed via the engine rotation speed sensor 12, and by acquiring results of the detection via the engine rotation speed acquisition portion 53 of the processing portion 51 of the ECU 50.

Besides, the demanded torque shown by a relation between the accelerator operation amount and the engine rotation speed is set and stored as a map beforehand in the storage portion 70 of the ECU 50. The demanded torque calculation portion 61 calculates the demanded torque by applying the accelerator operation amount acquired by the accelerator operation amount acquisition portion 52 and the engine rotation speed acquired by the engine rotation speed acquisition portion 53 to the map that is stored in the storage portion 70.

Next, it is determined whether or not the demanded torque can be achieved by using only the degree of throttle opening, that is, the degree of opening of the throttle valve 18 (step ST102). This determination is performed by the throttle opening degree determination portion 62 that is provided in the processing portion 51 of the ECU 50. The throttle opening degree determination portion 62 performs this determination on the basis of a map that is set and stored beforehand in the storage portion 70 of the ECU 50 and that shows a relation between of the engine rotation speed and the engine torque relative to the degree of throttle opening. The throttle opening degree determination portion 62 calculates the present estimated torque by applying the present degree of throttle opening that is controlled by the throttle valve control portion 55, and the engine rotation speed acquired by the engine rotation speed acquisition portion 53, to the map stored in the storage portion 70.

Furthermore, the throttle opening degree determination portion 62 compares the estimated torque with the demanded torque calculated by the demanded torque calculation portion 61, and determines whether or not the demanded torque can be realized by the estimated torque that changes in the case where it is assumed that the estimated torque is changed by adjusting the degree of throttle opening. If determining that the estimated torque can be realized within the predetermined time, the throttle opening degree determination portion 62 determines that the demanded torque can be realized by using only the degree of throttle opening. If determining that the estimated torque cannot be realized within the predetermined time, the throttle opening degree determination portion 62 determines that the demanded torque cannot be realized by using only the degree of throttle opening.

If it is determined by the throttle opening degree determination portion 62 (step ST102) that the demanded torque can be realized by using only the degree of throttle opening, a throttle command is given (step ST103). This throttle command is given by the throttle valve control portion 55 of the processing portion 51 of the ECU 50. The throttle valve control portion 55 calculates the degree of throttle opening or the amount of control of the throttle valve 18 for causing the present estimated torque estimated by the throttle opening degree determination portion 62 to be equal to the demanded torque calculated by the demanded torque calculation portion 61, and sends a command of control to the throttle valve 18 on the basis of a result of the calculation. Therefore, the throttle valve 18 operates to change its degree of opening according to the command sent thereto, so that the intake air amount changes so as to make the actual torque substantially equal in size to the demanded torque.

On the other hand, if it is determined by throttle opening degree determination portion 62 (step ST102) that the demanded torque cannot be achieved by using only the degree of throttle opening, it is then determined whether or not whether the driver's demand is a torque increase demand (step ST104). This determination is performed by the torque demand determination portion 63 of the processing portion 51 of the ECU 50. The torque demand determination portion 63 compares the estimated torque that is estimated by the throttle opening degree determination portion 62 and the demanded torque that is calculated by the demanded torque calculation portion 61. If the estimated torque is larger than the demanded torque, the torque demand determination portion 63 determines that the driver's demand is a torque increase demand. Conversely, if the comparison concludes that the estimated torque is smaller than the demanded torque, the torque demand determination portion 63 determines that the driver's demand is not a torque increase demand but a torque decrease demand.

If it is determined by the torque demand determination portion 63 (step ST104) that the driver's demand is a torque increase demand, it is then determined whether or not the charge-discharge balance is appropriate (step ST105). This determination is performed by the charge-discharge balance determination portion 64 of the processing portion 51 of the ECU 50. The charge-discharge balance determination portion 64 determines whether or not the amount of electricity stored in the battery 30 which is acquired by the amount-of-stored-electricity acquisition portion 58 of the processing portion 51 of the ECU 50 is within the range between a predetermined upper limit value and a predetermined lower limit value. If it is determined that the amount of stored electricity of the battery 30 is within this range, the charge-discharge balance determination portion 64 determines that the charge-discharge balance is appropriate. On the other hand, if the amount of stored electricity of the battery 30 acquired by the amount-of-stored-electricity acquisition portion 58 is not within the range between the predetermined upper limit value and the predetermined lower limit value, that is, if the amount of stored electricity of the battery 30 is above the upper limit value, or below the lower limit value, the charge-discharge balance determination portion 64 determines that the charge-discharge balance is not appropriate.

Incidentally, the predetermined upper limit value and the predetermined lower limit value of the amount of stored electricity of the battery 30 for use in this determination are set beforehand so as to define a range of the amount of stored electricity that allows the battery 30 to be used without causing a fault, and are stored in the storage portion 70 of the ECU 50. If it is determined by the charge-discharge balance determination portion 64 that the charge-discharge balance is not appropriate, the process goes to the foregoing step ST103, in which the throttle command is sent from the throttle valve control portion 55 to the throttle valve 18 in order to adjust the degree of throttle opening.

If it is determined by the charge-discharge balance determination portion 64 (step ST105) that the charge-discharge balance is appropriate, an alternator current command is given (step ST106). The alternator current command is given by the alternator load adjustment portion 59 of the processing portion 51 of the ECU 50. That is, since the load from the alternator 24 to the engine 10 can be changed by adjusting the amount of electricity generated by the alternator 24, the torque transferred from the engine 10 to the automatic transmission 35 can be correspondingly controlled. The alternator load adjustment portion 59 calculates an alternator load for causing the present estimated torque estimated by the throttle opening degree determination portion 62 to be equal to the demanded torque calculated by the demanded torque calculation portion 61.

The alternator load adjustment portion 59, after calculating the alternator load, also calculates the amount of electricity generation of the alternator 24 which causes the load transferred from the alternator 24 to the engine 10 to be equal to the calculated alternator load. The alternator load adjustment portion 59 controls the alternator 24 through the control of the regulator 25, and sends a command regarding the current to be generated by the alternator 24, to the regulator 25 that adjusts the amount of electricity generation of the alternator 24 so that the current generated by the alternator 24 becomes equal to the calculated amount of electricity generation. Therefore, the alternator 24 operates so that the current generated by the alternator 24 changes according to the command set to the regulator 25. Thus, the load given from the alternator 24 to the engine 10 changes. Therefore, the torque transferred from the engine 10 to the automatic transmission 35 changes so that the torque output from the engine 10 becomes substantially the same in magnitude as the demanded torque.

However, if it is determined by the torque demand determination portion 63 (step ST104) that the driver's demand is not a torque increase demand, that is, it is determined that the driver's demand is a torque decrease demand, it is then determined whether or not the condition for retarding the ignition timing is met (step ST107). This determination is performed by the ignition timing retardation determination portion 65 of the processing portion 51 of the ECU 50. That is, torque decrease can be realized by retarding the ignition timing. The ignition timing retardation determination portion 65 determines whether or not a misfire will occur if the ignition timing is retarded from the present ignition timing for the purpose of realizing the demanded torque by performing the torque decrease.

This determination is performed by the ignition timing retardation determination portion 65 on the basis of the intake air amount that is calculated from a result of detection provided by a known air flow meter (not shown) that is provided in the intake passageway 15, the mixture ratio between air and fuel that is calculated from the intake air amount and the control amount of the fuel injector, the engine rotation speed acquired by the engine rotation speed acquisition portion 53, etc. The ignition timing retardation determination portion 65 determines the state of combustion of fuel on the basis of the calculated intake air amount, the calculated mixture ratio and the engine rotation speed. In the case where it is determined that misfire will not occur if the ignition timing is retarded to the ignition timing that will achieve the demanded torque, the ignition timing retardation determination portion 65 determines that the condition for retarding the ignition timing is met. On the other hand, in the case where it is determined that misfire will occur if the ignition timing is retarded to the ignition timing that will achieve the demanded torque, the ignition timing retardation determination portion 65 determines that the condition for retarding the ignition timing is not met.

Incidentally, combustion possible regions or misfire regions in relation to the intake air amount, the mixture ratio, the engine rotation speed and the ignition timing are stored beforehand as a map in the storage portion 70 of the ECU 50. The ignition timing retardation determination portion 65 determines whether or not misfire will occur, by applying to this map the state of operation of the engine 11 in which the ignition timing has been retarded in order to realize the demanded torque. If it is determined by the ignition timing retardation determination portion 65 that the condition for retarding the ignition timing is not met, the process goes to the foregoing step ST105, in which it is determined whether or not the charge-discharge balance is appropriate.

If it is determined by the ignition timing retardation determination portion 65 (step ST107) that the condition for retarding the ignition timing is met, a command to retard the ignition timing is given (step ST108). The ignition timing retardation command is given by the ignition timing control portion 56 of the processing portion 51 of the ECU 50. That is, the ignition timing control portion 56 calculates an ignition timing for causing the present estimated torque estimated by the throttle opening degree determination portion 62 to be equal to the demanded torque calculated by the demanded torque calculation portion 61 by retarding the ignition timing.

The ignition timing control portion 56 sends to the ignition circuit 11 a timing retardation command that is a command regarding the ignition timing which is given to cause the torque output from the engine 10 to be equal to the demanded torque by retarding the ignition timing. Therefore, the ignition circuit 11 discharges the ignition plug at the ignition timing that is commensurate with the command sent thereto. Due to this, the timing of starting the combustion of fuel in the combustion stroke of each cylinder is retarded, and the efficiency in using the energy produced during combustion as torque declines. Hence, the torque output from the engine 10 is decreased to become substantially equal in magnitude to the demanded torque.

In the vehicle control apparatus 2 in accordance with the first embodiment, in the case where the demanded torque can be achieved by employing only the control of the degree of throttle opening, the torque output from the engine 10 is changed to a torque that is substantially the same in magnitude as the demanded torque, by controlling the degree of throttle opening, and by adjusting the amount of fuel injection according to the intake air amount that is changed by changing the degree of throttle opening.

Besides, in the case where the demanded torque cannot be achieved by employing only the control of the degree of throttle opening, the torque output from the engine 10 is changed to a torque that is substantially the same in magnitude as the demanded torque by performing the control of the alternator load and the retardation control of the ignition timing according to the charge-discharge balance of the battery 30 and the condition for retarding the ignition timing. That is, in the case where the demanded torque cannot be achieved by employing only the control of the degree of throttle opening, the demanded torque is achieved by performing a coordinated control combining the control of retarding the ignition timing and the control of the alternator load.

During operation of the engine 1, the torque is controlled by not performing only the control of the degree of throttle opening but performing a coordinated control combining the control of the alternator load and the retardation control of the ignition timing as well as the control of the degree of throttle opening. In the case where the torque is controlled by performing the control of the alternator load and/or the control of retarding the ignition timing, states of the vehicle other than the charge-discharge balance of the battery 30 and the condition for retarding the ignition timing are also taken into account. For example, in the case where the ignition timing is retarded, the temperature of exhaust gas rises, so that the temperature of the catalyst 20 that purifies exhaust gas is also likely to rise. If the temperature of the catalyst 20 becomes excessively high, the catalyst 20 may sometimes degrade so that the exhaust gas purifying performance may decline. Therefore, in the case where the torque is controlled by the control of the alternator load and the retardation control of the ignition timing, the temperature of the catalyst 20 is taken into account in performing the control so that a certain exhaust gas purification performance of the catalyst 20 is secured.

An example of the case where the temperature of the catalyst 20 is taken into account in performing the control is given herein. That is, in the case where the retardation control of the ignition timing is performed, the temperature of the catalyst 20 becomes higher the longer the duration of the ignition timing retardation control. Therefore, if the ignition timing retardation control duration that is the duration during which the retardation control of the ignition timing is performed is longer than a predetermined set time, the control of the torque through the ignition timing retardation control is substituted with the torque control through the alternator load control.

Besides, the temperature of the catalyst 20 rises during the ignition timing retardation control, and declines if the ignition timing retardation control is stopped. However, in the case where the retardation control of the ignition timing is repeatedly performed, if the intervals between executions of the ignition timing retardation control are shorter than a predetermined set time, the decline of the temperature of the catalyst 20 is also small in the case where the ignition timing retardation control is stopped. Therefore, in this case, the retardation control of the intake timing for the control of the torque is substituted with the control of the alternator load, or is combined with the alternator load control.

Besides, if the catalyst 20 is estimated to have excessively high temperature in the case where the ignition timing retardation control is performed, the ignition timing retardation control for the torque control is substituted with the control of the alternator load, or is combined with the control of the alternator load. However, the control based on the alternator load also has a limit in the amount of control in connection with the charge-discharge balance of the battery 30. Therefore, in the case where the control of the alternator load is executed while the retardation control of the ignition timing is executed, the combined control is switched again to the ignition timing retardation control if the duration of the control of the alternator load exceeds a predetermined set time or the voltage of the battery 30 becomes below a lower limit.

Figure 4:
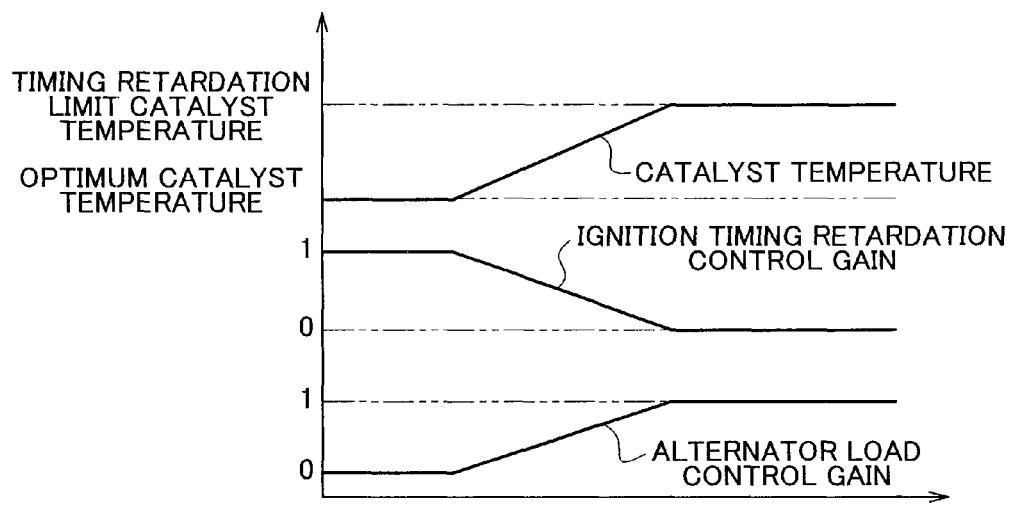
FIG. 4 is an illustrative diagram for the gains of a retardation control of the ignition timing relative and a control of the alternator load relative to the temperature of a catalyst in the vehicle control apparatus in accordance with the first embodiment.

FIG. 4 is an illustrative diagram of gains of the ignition timing retardation control and the alternator load control relative to the temperature of the catalyst. In the case where the torque is controlled by the coordinated control combining the control of the alternator load and the retardation control of the ignition timing while the temperature of the catalyst 20 is taken into account, the amount of control of the ignition timing retardation and the amount of control of the alternator load are adjusted if the duration of performing the ignition timing retardation control or the intervals between durations of the ignition timing retardation control are such that the temperature of the catalyst 20 is expected to rise. When these amounts of control are to be adjusted, the temperature of the catalyst 20 may be directly detected. In the case where the temperature of the catalyst 20 is directly detected to adjust the amount of control of the ignition timing retardation and the amount of control of the alternator load, the temperature of the catalyst 20 detected by the catalyst temperature sensor 21 is acquired by the catalyst temperature acquisition portion 60 of the processing portion 51 of the ECU 50. Then, the ignition timing control portion 56 and the alternator load adjustment portion 59 adjust the amounts of control on the basis of the temperature of the catalyst 20 acquired by the catalyst temperature acquisition portion 60.

That is, since the temperature of the catalyst 20 rises with increases in the temperature of the exhaust gas in the case where the ignition timing is retarded, the retardation of the ignition timing is reduced if the temperature of the catalyst 20 becomes higher than a predetermined temperature in the case where the torque is controlled by the control of the alternator load and the retardation control of the ignition timing. Besides, in the case where the retardation of the ignition timing is reduced, the amount of change of the torque obtained when the torque is controlled by controlling the ignition timing reduces. The amount of reduction in the amount of change is compensated by changing the amount of control of the alternator load.

Concretely, the ignition timing control portion 56 sets a timing retardation control gain that is a gain obtained at the time of performing the ignition timing retardation control, and then performs the ignition timing retardation control, and the alternator load adjustment portion 59 sets an alternator load control gain that is a gain obtained at the time of performing the control of the alternator load that is given from the alternator 24 to the engine 10 during electricity generation of the alternator 24, and then performs the control of the alternator load.

In the case where the control of reducing the torque output from the engine 10 is performed by the ignition timing retardation control, if the catalyst temperature acquired by the catalyst temperature acquisition portion 60 is higher than an optimum catalyst temperature that is a temperature optimum for the catalyst 20 to purify exhaust gas, the ignition timing control portion 56 reduces the ignition timing retardation control gain as the catalyst temperature rises as shown in FIG. 4. The ignition timing retardation control gain that is reduced with increases in the catalyst temperature as described above is set so as to become zero when the catalyst temperature reaches the vicinity of a retardation-limit catalyst temperature that is a limit of the temperature that is allowable in the case where the catalyst temperature rises due to retardation of the ignition timing.

Beside, the alternator load adjustment portion 59 increases the alternator load control gain as the catalyst temperature above the optimum catalyst temperature rises, as shown in FIG. 4. The alternator load control gain is set so as to be "1" when the catalyst temperature, increasing due to retardation of the ignition timing, reaches the vicinity of the retardation-limit catalyst temperature.

In the case where the demanded torque cannot be achieved by employing only the control of the degree of throttle opening and therefore the control of torque decrease is made up for by the retardation control of the ignition timing, if the catalyst temperature becomes higher than the optimum catalyst temperature as mentioned above, the amount of control of the ignition timing retardation control is reduced by lowering the ignition timing retardation control gain, so that the amount of timing retardation also reduces. In this case, the degree of increase of the temperature of the exhaust gas that increases with retardation of the ignition timing reduces, and the catalyst temperature also comes to less readily rise. If the amount of retardation is reduced, the amount of control of the torque decrease achieved by retarding the ignition timing also declines.

The thus-reduced amount of control of torque decrease is supplemented by the amount of control of torque decrease achieved by adjusting the alternator load. That is, in the case where the catalyst temperature becomes higher than the optimum catalyst temperature, the alternator load control gain is increased to increase the amount of electricity generation of the alternator 24 and therefore increase the load given from the alternator 24 to the engine 10, so that the torque output from the engine 10 to the automatic transmission 35 is reduced. Therefore, in the case where the catalyst temperature is higher than the optimum catalyst temperature, the reduction of the amount of control of torque decrease caused when the amount of retardation of the ignition timing is reduced in order to restrain the increase of the catalyst temperature can be compensated by increasing the alternator load. Hence, the torque output from the engine 10 to the transmission 35 becomes close to the demanded torque.

Figure 5:
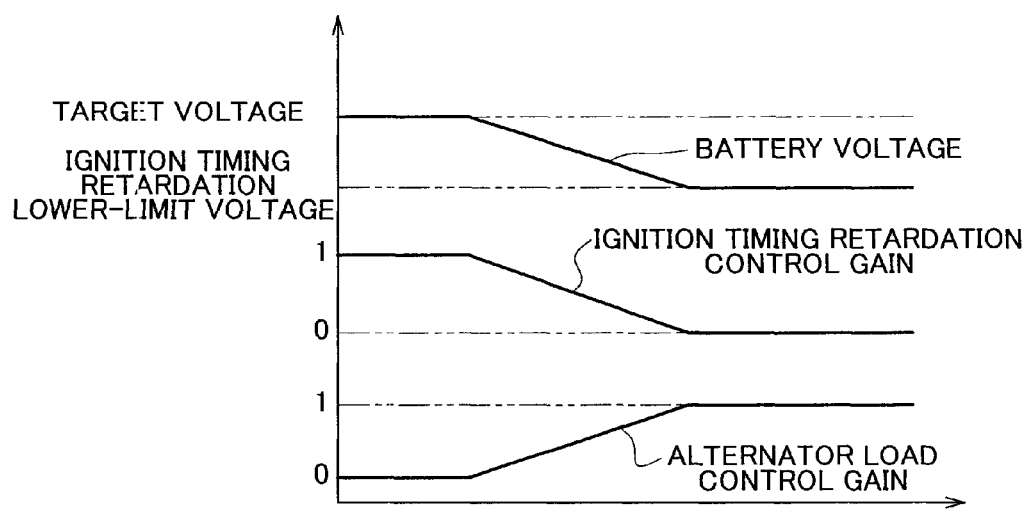
FIG. 5 is an illustrative diagram for the gains of the retardation control of the ignition timing relative and the control of the alternator load relative to the battery voltage in the vehicle control apparatus in accordance with the first embodiment.

FIG. 5 is an illustrative diagram of the gains of the ignition timing retardation control and the alternator load control relative to the battery voltage. Besides, in the case where the coordinated control combining the ignition timing retardation control and the alternator load control is performed with the state of the vehicle 1 taken into account, the amount of stored electricity of the battery 30 is also taken into account. That is, when the voltage of the battery 30, which changes depending on the amount of stored electricity of the battery 30, or the SOC (state of charge) of the battery 30, is lower than a predetermined value, the ignition by the ignition plug igniting through the use of electricity from the battery 30 is likely to become unstable. Therefore, in this case, the ignition timing retardation control for the control of the torque is substituted with the control of the alternator load, or is combined with the control of the alternator load. That is, in the case where the amount of stored electricity of the battery 30 declines, the amount of electricity generation of the alternator 24 is increased.

Concretely, in the case where the control of the torque through the control of the alternator load and the retardation control of the ignition timing is performed on the basis of the amount of stored electricity of the battery 30, the amount of stored electricity of the battery 30 is acquired by the amount-of-stored-electricity acquisition portion 58 of the processing portion 51 of the ECU 50, and then the alternator load adjustment portion 59 and the ignition timing control portion 56 adjust the amounts of control on the basis of the amount of stored electricity of the battery 30 acquired by the amount-of-stored-electricity acquisition portion 58.

That is, in the case where the amount of stored electricity of the battery 30 has declined, there is a need to increase the amount of stored electricity by increasing the amount of electricity supplied to the battery 30. Therefore, if the amount of stored electricity of the battery 30 becomes lower than a predetermined amount of stored electricity in the case where the torque is controlled through the control of the alternator load and the retardation control of the ignition timing, the amount of electricity generation of the alternator 24 is increased. That is, the alternator load is increased. Besides, in the case where the alternator load is increased, the amount of change in the torque that occurs when the torque is controlled by controlling the alternator load increases, and therefore the amount of increase in the amount of change is compensated by changing the amount of retardation of the ignition timing.

It is to be noted herein that storage of electricity into the battery and generation of electricity in the battery 30 are not storage of electricity itself into the battery 30 and release of electricity therefrom, respectively, but are performed through chemical reactions within the battery 30. Therefore, in the case where the amount of stored electricity of the battery 30 is to be determined, the amount of electricity that is estimated to be able to be generated by the battery 30 is determined as the amount of stored electricity by detecting the voltage of the battery 30, and by determining the ability of the battery 30 to generate electricity on the basis of the voltage of the battery 30. Therefore, in the case where the amount of stored electricity of the battery 30 is acquired by the amount-of-stored-electricity acquisition portion 58, the voltage of the electricity generated by the battery 30 is detected, and if the voltage of the electricity generated by the battery 30 is lower than a predetermined voltage, it is determined that the amount of stored electricity of the battery 30 has declined.

The amount of stored electricity of the battery 30 is determined on the basis of the voltage, as described above. In the case where the control of the torque output from the engine 10 is performed through the retardation control of the ignition timing, if the battery voltage acquired by the amount-of-stored-electricity acquisition portion 58 is lower than a predetermined set value, the amount of electricity generation of the alternator 24 is increased. Specifically, if the battery voltage acquired by the amount-of-stored-electricity acquisition portion 58 is lower than a target voltage that is a voltage that is able to appropriately operate various electrical component parts of the vehicle 1 when electricity is supplied to the electrical component parts, the alternator load adjustment portion 59 increases the alternator load control gain as the battery voltage declines, as shown in FIG. 5. The alternator load control gain that is increased with decreases in the battery voltage as described above is set so as to be "1" when the battery voltage reaches the vicinity of a retardation control lower-limit voltage that is a lower limit value of the battery voltage that allows appropriate performance of the ignition timing retardation control.

Besides, the ignition timing control portion 56 reduces the ignition timing retardation control gain as the battery voltage below the target voltage declines, as shown in FIG. 5. The ignition timing retardation control gain is set so as to decline with increases in the alternator load control gain in order to compensate reduction of the torque output from the engine 10 which is reduced by increasing the alternator load control gain, and is set so as to become zero when the alternator load control gain becomes close to "1".

In the case where the demanded torque cannot be achieved by employing only the control of the degree of throttle opening, if the battery voltage declines when the control of torque decrease is supplemented by the ignition timing retardation control, the alternator load control gain is increased as the battery voltage declines, as described above. Due to this, the amount of electricity generation of the alternator 24 is increased to increase the amount of electricity charged from the alternator 24 into the battery 30. Thus, in the case where the amount of electricity generation of the alternator 24 is increased, the alternator load increases, so that the torque output from the engine 10 declines. Therefore, when the alternator load control gain is increased, the ignition timing retardation control gain is reduced with increases in the alternator load control gain. In the case where the ignition timing retardation control gain is reduced in this manner, the amount of retardation of the ignition timing reduces, so that the amount of control of the torque decrease achieved, by retarding the ignition timing also declines.

That is, in the case where the amount of stored electricity of the battery 30 declines, the amount of electricity generation of the alternator 24 is increased to increase the load given from the alternator 24 to the engine 10, so that the torque output from the engine 10 to the automatic transmission 35 reduces. However, in this case, the amount of control of the torque decrease achieved by the retardation control is reduced by reducing the amount of retardation of the ignition timing. Due to this, the amount of reduction of the torque output from the engine 10 to the automatic transmission 35 that is caused by increase of the alternator load that is performed when the amount of electricity generation of the alternator 24 is increased can be compensated by reducing the amount of retardation of the ignition timing. Therefore, the torque output from the engine 10 to the automatic transmission 35 becomes close to the demanded torque.

In the case where the ignition timing retardation control and the alternator load control are performed according to the amount of stored electricity of the battery 30 as described above, if the battery voltage or the SOC is lower than a predetermined set value, it is possible to carry out torque decrease while achieving good charge-discharge balance, by increasing the alternator load and therefore increasing the amount of electricity generation in order to raise the battery voltage.

Figure 6:
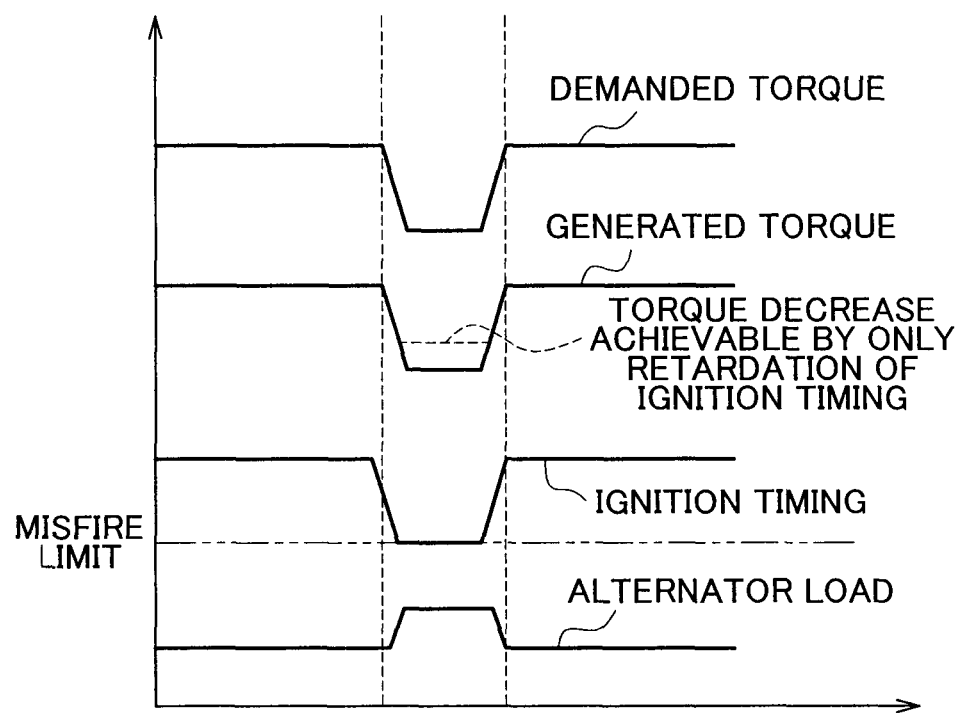
FIG. 6 is an illustrative diagram of a torque control that includes a control performed when the ignition timing reaches a misfire limit, in the vehicle control apparatus in accordance with the first embodiment.

FIG. 6 is an illustrative diagram of a torque control that includes a control performed when the ignition timing reaches a misfire limit. Besides, the retardation control of the ignition timing reduces the combustion pressure during the combustion stroke of the engine and therefore reduces the torque generated by the engine 10, by retarding the timing of igniting fuel by the ignition plug during the combustion stroke. However, if the ignition timing is excessively retarded, it sometimes happens that fuel fails to continuously burn, resulting in a misfire. Therefore, in the case where torque decrease is achieved through the retardation control of the ignition timing, there is a need to retard the ignition timing within such a range that misfiring is avoided. However, if the amount of torque decrease caused by the demanded torque is large in the case where the ignition timing retardation is restricted so as to avoid occurrence of misfire, it sometimes happens that the amount of torque decrease for the demanded torque cannot be realized by the retardation control. Therefore, in this case, the torque output from the engine 10 is reduced by increasing the alternator load.

Concretely, in the case where the demanded torque can be realized by performing only the control of the degree of throttle opening as shown in FIG. 6, the generated torque that is the torque that is actually generated by the engine 10 and that is output to the outside can be made substantially equal in magnitude to the demanded torque by adjusting the degree of throttle opening through the control of the throttle valve 18 by the throttle valve control portion 55, or by adjusting the amount of fuel injection front the fuel injector, etc. In this case, since the demanded torque can be achieved by adjusting only the degree of throttle opening, the retardation control of the ignition timing is not performed, and the alternator load is set at a level of magnitude of load that occurs during usual electricity generation of the alternator 24.

In the case where, during the foregoing state, the demanded torque has sharply declined and there is a demand for a considerable torque decrease, if the demanded torque cannot be achieved by adjusting only the degree of throttle opening, the retardation control of the ignition timing is performed by the ignition timing control portion 56. Due to this, the generated torque declines according to the torque decrease demand of the demanded torque.

The torque decrease of the generated torque based on the torque decrease of the demanded torque can be carried out by performing the ignition timing retardation control as described above. However, since excessive retardation of the ignition timing sometimes results in misfire, the ignition timing control portion 56 controls the ignition timing within a range that does not exceeds a misfire limit that is a limit of the timing on the retarded ignition timing side at which combustion of fuel can be performed normally without causing misfire. That is, if the ignition timing reaches the misfire limit in the case where the ignition timing is retarded, the ignition timing Control portion 56 stops further performance of the control of the ignition timing in the retardation direction.

The ignition timing control portion 56 stops further retardation of the ignition timing if the ignition timing reaches the misfire limit. If the ignition timing reaches the misfire limit in the case where the torque decrease is carried out by performing the ignition timing retardation control, the alternator load adjustment portion 59 increases the alternator load. Due to this, the generated torque from the engine 10 to the automatic transmission 35 declines, thus achieving a torque decrease.

That is, if the ignition timing reaches the misfire limit in the case where the torque decrease is carried out by retarding the ignition timing, further retardation of the ignition timing is not performed. Therefore, if the torque decrease of the demanded torque is larger than the torque decrease achievable by the retardation of the ignition timing to the misfire limit, the torque decrease of the demanded torque cannot be realized by performing only the ignition timing retardation control. However, in this case, the alternator load is increased by the alternator load adjustment portion 59, whereby the generated torque is decreased. Therefore, the amount of reduction of the generated torque is larger than the amount of reduction of the torque that is achieved when the generated torque is reduced only by retarding the ignition timing, so that the amount of the torque decrease becomes larger than the amount of the torque decrease that can be realized by performing only the retardation of the ignition timing.

That is, in the case where the retardation control of the ignition timing is performed, the alternator load is increased if the ignition timing reaches the misfire limit. Therefore, the torque decrease that cannot be realized due to the restriction of the amount of timing retardation can be compensated by the torque decrease that is achieved by increasing the alternator load. Therefore, the generated torque output from the engine 10 becomes close to the demanded torque. That is, in the case where the amount of control that is demanded of the ignition timing retardation control, exceeds the misfire limit, the feasibility of the demanded torque can be improved through a combined use of the ignition timing retardation control and the alternator load control.

Thus, at the time of the torque decrease of the demanded torque, the generated torque is decreased according to the demanded torque by performing the retardation control of the ignition timing and adjusting the alternator load. Then, when the torque decrease of the demanded torque ends and the torque prior to the torque decrease is resumed, the ignition timing and the alternator load are set back to the states occurring prior to the output of the demand for the torque decrease.

The above-described vehicle control apparatus 2 is constructed to be able to adjust the torque generated by the engine 10, by performing the retardation control of the ignition timing of the engine 10 via an ignition timing retardation control portion. Besides, the vehicle control apparatus 2 is also able to adjust the alternator load that is the load given from the alternator 24 to the engine during electricity generation, by controlling the amount of electricity generation of the alternator 24 via the alternator load adjustment portion 59, and is also able to adjust the torque output from the engine 10, by adjusting the alternator load. Due to this, in the case where a demanded torque cannot be achieved by using only the degree of throttle opening when the torque output from the engine 10 is adjusted, the demanded torque is achieved by performing a coordinated control combining the retardation control of the ignition timing and the control of the alternator load.

Furthermore, in the case where the coordinated control combining the retardation control of the ignition timing and the control of the alternator load is performed, the retardation of the ignition timing is reduced by the ignition timing control portion 56 and the alternator load is increased by the alternator load adjustment portion 59 as the temperature of the catalyst 20 acquired by the catalyst temperature acquisition portion 60 increases. That is, although the performance of the ignition timing retardation control makes the temperature of the catalyst 20 likely to rise, the excessive increase of the temperature of the catalyst 20 can be restrained by reducing the retardation of the ignition timing with increases in the temperature of the catalyst 20 in the case where the demanded torque is to be achieved by controlling the torque decrease through execution of the ignition timing retardation control.

Besides, in the case where the retardation of the ignition timing is reduced in the foregoing manner, the amount of control achieved during the control of the torque decrease reduces. However, the torque output from the engine 10 can be reduced by increasing the alternator load through the control performed by the alternator load adjustment portion 59 as the temperature of the catalyst 20 increases. That is, the amount of control of the torque decrease achieved through the ignition timing retardation control which is reduced with the increasing temperature of the catalyst 20 can be supplemented with the control of the alternator load. As a result, the coordinated control combining the control of the alternator load for controlling the output from the engine 10, and the retardation control of the ignition timing that is another control, can be performed more appropriately.

Besides, at the time of performing the coordinated control combining the ignition timing retardation control and the alternator load control, it is possible to achieve the demanded torque while maintaining a desired temperature of the catalyst 20 by performing the coordinated control with the temperature situation of the catalyst 20 factored in, and supplementing the amount of control of the torque decrease achieved by the ignition timing retardation control with the alternator load control while taking the temperature of the catalyst 20 into account. As a result, it is possible to realize a desired state of engine operation while restraining the degradation of the catalyst 20 and the deterioration of the exhaust gas emission performance resulting from the temperature rise of the catalyst 20.

Besides, an optimum catalyst temperature that is an optimum temperature for the catalyst 20 to purify the exhaust gas is set. Then, if the catalyst temperature acquired by the catalyst temperature acquisition portion 60 becomes higher than the optimum catalyst temperature, the ignition timing control portion 56 reduces the amount of retardation of the ignition timing. Therefore, the temperature rise of the catalyst 20 can be restrained more appropriately. That is, in the case where the temperature of the catalyst 20 rises, the amount of retardation of the ignition timing is reduced. However, in the case where the amount of retardation of the ignition timing is reduced during the control of torque decrease, the amount of control of the torque decrease achieved by the ignition timing retardation control declines, so that the control of the alternator load also needs to be performed. Therefore, in the case where the amount of retardation of the ignition timing is reduced at an early stage of the increase of the catalyst temperature, the coordinated control combining the ignition timing retardation control and the alternator load control needs to be performed from an early stage on. Hence, during the control of torque decrease performed by the ignition timing retardation control, the catalyst temperature and the optimum catalyst temperature are compared. If the catalyst temperature becomes higher than the optimum catalyst temperature, the amount of retardation of the ignition timing is reduced. In this manner, the opportunities of performing the torque control through the coordinated control combining the ignition timing retardation control and the alternator load control can be reduced. As a result, the restraint of the temperature rise of the catalyst 20 and the control of the torque decrease can be performed more appropriately and easily.

Besides, in the case where the torque output from the engine 10 is controlled through the coordinated control combining the retardation control of the ignition timing and the control of the alternator load, the alternator load is increased by the alternator load adjustment portion 59 and the retardation of the ignition timing is reduced by the ignition timing control portion 56 with decreases in the amount of stored electricity of the battery 30 acquired by the amount-of-stored-electricity acquisition portion 58. That is, if the amount of stored electricity of the battery 30 declines, there sometimes occurs decline in the stability of operation of electrical component parts that operate on electricity from the battery 30. However, if the amount of stored electricity of the battery 30 declines when the torque decrease is controlled through the coordinated control combining the retardation control of the ignition timing and the control of the alternator load, the reduced amount of stored electricity of the battery 30 can be increased by increasing the alternator load and therefore increasing the amount of electricity generation of the alternator 24 regardless of the present electric power consumption.

Besides, in the case where the alternator load is increased in the foregoing manner, the amount of control achieved during the control of the torque decrease increases, and therefore it becomes easier to reduce the torque. Excessive reduction of the torque output from the engine 10 can be restrained by reducing the amount of retardation of the ignition timing controlled by the ignition timing control portion 56 in accordance with decreases in the amount of stored electricity of the battery 30. That is, the amount of control of the torque decrease which has been increased by the alternator load that is increased with decreases in the amount of stored electricity of the battery 30 can be supplemented by the retardation control of the ignition timing. As a result, it becomes possible to more appropriately perform the coordinated control combining the retardation control of the ignition timing employed for controlling the output from the engine 10, and the control of the alternator load.

Besides, when the coordinated control combining the retardation control of the ignition timing and the control of the alternator load is performed, it is possible to achieve the demanded torque while maintaining an appropriate amount of stored electricity of the battery 30, by changing the amount of electricity generation of the alternator 24 according to the amount of stored electricity of the battery 30 and by compensating the change in the amount of control of the torque decrease caused by the change in the alternator load that is associated with the change in the amount of electricity generation, with the retardation control of the ignition timing. As a result, it is possible to realize a desired state of engine operation while securing an amount of stored electricity of the battery 30.

Besides, a target voltage is set as the amount of stored electricity of the battery 30 that enables various electrical component parts to stably operate. If the battery voltage acquired by the amount-of-stored-electricity acquisition portion 58 is lower than the target voltage, the alternator load adjustment portion 59 increases the alternator load, so that an amount of stored electricity of the battery 30 can be more reliably secured regardless of the electric power consumption. That is, in the case where the amount of stored electricity of the battery 30 reduces, the alternator load is increased. In the case where the alternator load is increased at the time of controlling the torque decrease, the amount of control of torque decrease achieved by the control of the alternator load increases, so that the amount of retardation of the ignition timing also needs to be controlled. Therefore, in the case where the alternator load is increased at an early stage regarding the amount of stored electricity of the battery 30, the amount of retardation of the ignition timing needs to be reduced at an early stage in order to restrain excessive increase of the amount of control of the torque decrease. Therefore, in the case where the torque decrease is controlled with the amount of stored electricity of the battery 30 taken into account, the battery voltage for use in determining the amount of stored electricity of the battery 30 is compared with a target voltage that is a battery voltage that serves as a target. When the battery voltage becomes lower than the target voltage, the alternator load is increased. In this manner, it is possible to reduce the opportunities of performing the torque control through the coordinated control combining the retardation control of the ignition timing and the control of the alternator load. As a result, it becomes possible to more appropriately and easily secure an amount of stored electricity of the battery 30 and control the torque decrease.

Besides, at the time of, the coordinated control combining the ignition timing retardation control and the alternator load control, the alternator load adjustment portion 59 increases the alternator load if the ignition timing reaches the misfire limit due to the ignition timing control portion 56 performing the ignition timing retardation control. Therefore, the demanded torque can be more certainly achieved. That is, in the case where the retardation control of the ignition timing is performed, if the amount of retardation is excessively large, misfire sometimes occurs. Therefore, the ignition timing control portion 56, when performing the ignition timing retardation control, performs the ignition timing retardation control within the range defined by the misfire limit. Therefore, since the torque decrease control through the ignition timing retardation control is performed within the range of timing defined by the misfire limit, the demanded torque sometimes cannot be achieved by the ignition timing retardation control if the amount of torque decrease of the demanded torque is large. In the vehicle control apparatus 2 in accordance with the first embodiment, the alternator load is increased by the alternator load adjustment portion 59 if the ignition timing reaches the misfire limit. Due to this, even in the case where the ignition timing has reached the misfire limit, the shortfall in the amount of control of torque decrease occurring when the torque decrease is performed by the ignition timing retardation control can be compensated by the control of the alternator load. As a result, it is possible to appropriately perform the coordinated control combining the control of the alternator load for controlling the output from the engine 10 and the retardation control of the ignition timing.

Besides, since the ignition timing retardation control is performed within the range of the ignition timing defined by the misfire limit, the torque decrease control can be performed during the control of the torque through the ignition timing retardation control, without causing misfire. As a result, it is possible to more certainly achieve the demanded torque while maintaining a normal operation state of the engine 10.

Figure 7:
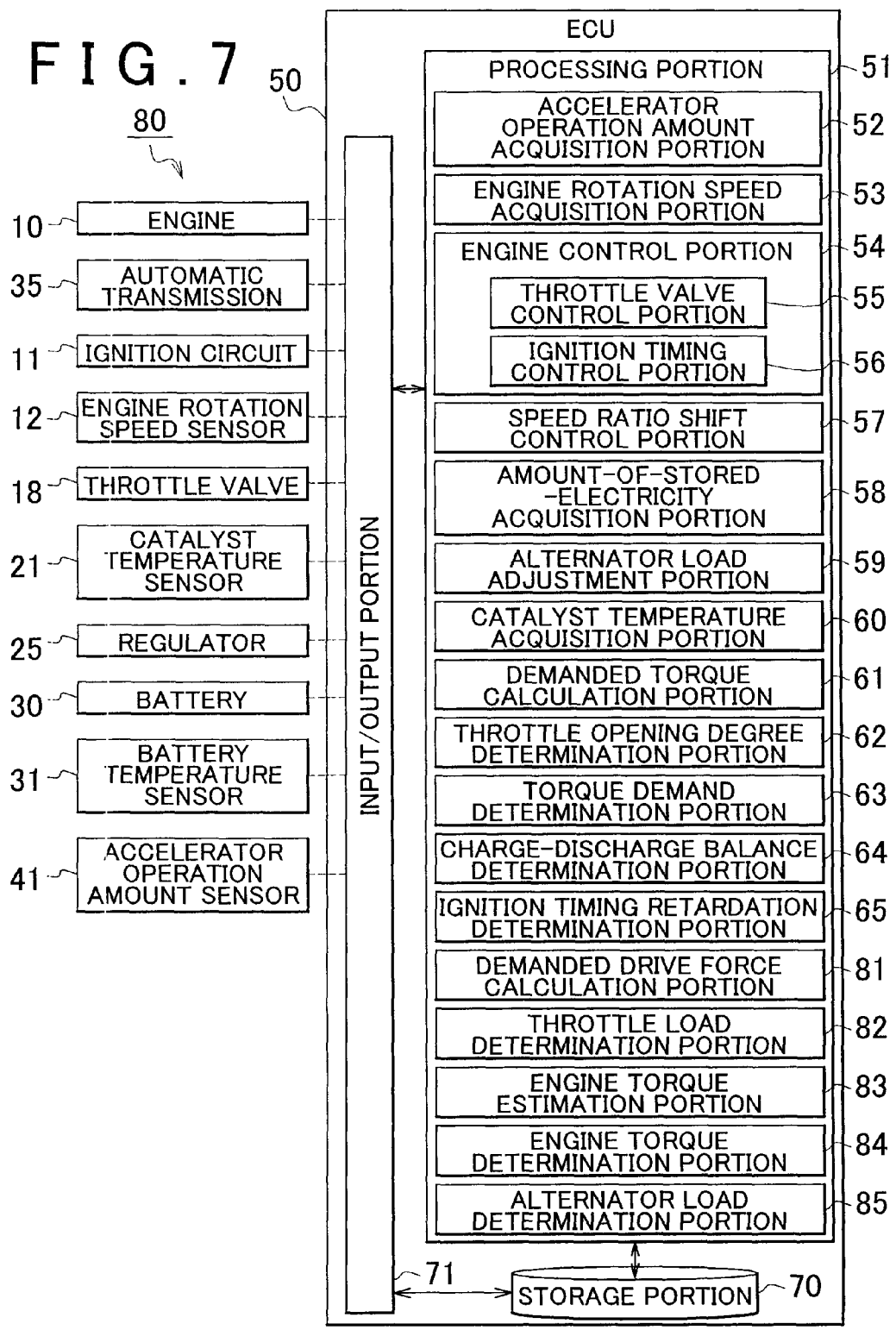
FIG. 7 is a construction diagram of portions of a vehicle control apparatus in accordance with a second embodiment.

A vehicle control apparatus 80 in accordance with a second embodiment of the invention has substantially the same construction as the vehicle control apparatus 2 in accordance with the first embodiment, but is characterized in that, at the time of controlling the alternator load for the purpose of controlling the torque output from an engine 10, the alternator load is controlled on the basis of the state of a throttle valve 18 or the state of the torque that is adjusted by the throttle valve 18. Other constructions of the second embodiment are substantially the same as those of the first embodiment, and are represented by the same reference characters while descriptions thereof are omitted below. FIG. 7 is a construction diagram of portions of the vehicle control apparatus in accordance with the second embodiment. The vehicle control apparatus 80 in accordance with the second embodiment is provided so as to be able to perform a traction control, and a vibration restraint control of restraining vibration that occurs in the vehicle 1. Therefore, the torque from the engine 10 is controlled by the traction control and the vibration restraint control besides the control of the torque of the engine 10 through a driver's operation of an accelerator pedal 40.

Incidentally, the traction control and the vibration restraint control are known controls. Concretely, the traction control refers to a control of reducing the drive force so as to restrain slip of driving wheels that generate drive force as the torque output from the engine 10 is transferred thereto, when at least one of the driving wheels slips. Besides, the vibration restraint control refers to a control of restraining the vibrations that occur in a vehicle body during travel of the vehicle 1, by estimating wheel torques that actually act on wheels 5 from wheel speeds that are detected by wheel speed sensors (not shown) provided for the individual wheels 5, and estimating the vibration that occurs in the vehicle body on the basis of a difference between the estimated wheel torque and a wheel torque that is able to generate the demanded drive force, and correcting the drive force by a correction value of the drive force for restraining the estimated vibration, and causing the corrected drive force to be generated.

The vehicle control apparatus 80 in accordance with the second embodiment has an ECU 50 that controls various portions, as in the vehicle control apparatus 2 in accordance with the first embodiment. A processing portion 51 of the ECU 50 has an accelerator operation amount acquisition portion 52, an engine rotation speed acquisition portion 53, an engine control portion 54, a throttle valve control portion 55, an ignition timing control portion 56, a speed ratio shift control portion 57, an amount-of-stored-electricity acquisition portion 58, an alternator load adjustment portion 59, a catalyst temperature acquisition portion 60, a demanded torque calculation portion 61, a throttle opening degree determination portion 62, a torque demand determination portion 63, a charge-discharge balance determination portion 64, and an ignition timing retardation determination portion 65.

Furthermore, the processing portion 51 has: a demanded drive force calculation portion 81 that calculates a demanded drive force that is a drive force demanded through a driver's operation or an operation control of the vehicle 1; a throttle load determination portion 82 that determines whether or not the load of the throttle valve 18 is excessively large; an engine torque estimation portion 83 that estimates the torque that the engine 10 generates; an engine torque determination portion 84 that determines whether or not the engine torque has reached a predetermined torque; and an alternator load determination portion 85 that is an accessory load determination portion that determines whether or not the alternator load has reached a predetermined load.

The vehicle control apparatus 80 in accordance with the second embodiment is constructed as described above. Operation of the vehicle control apparatus 80 will be described below. The vehicle control apparatus 80 in accordance with the second embodiment performs the traction control and the vibration restraint control while the vehicle 1 is traveling. In the traction control and the vibration restraint control, the demanded drive force demanded by the driver or a demanded drive force having such a magnitude as to be able to restrain slip of the wheels 5 and vibration of the vehicle 1 is calculated by the demanded drive force calculation portion 81 of the processing portion 51 of the ECU 50 on the basis of the accelerator operation amount acquired by the accelerator operation amount acquisition portion 52 and detection results provided by various detection means, such as wheel speed sensors (not shown) that are provided near the wheels 5 and detect the wheel speeds of the corresponding wheels.

The vehicle control apparatus 80 in accordance with the second embodiment, being able to perform the traction control and the vibration restraint control, is able to perform a coordinated control combining the control of the degree of throttle opening, the control of the alternator load and the retardation control of the ignition timing even when performing the traction control or the vibration restraint control. The processing procedure employed in this case is substantially the same as the processing procedure employed when the coordinated control is performed in the vehicle control apparatus 2 in accordance with the first embodiment. In the procedure, when the demanded torque is to be acquired (see step ST101 in FIG. 3), the demanded torque is calculated on the basis of the demanded drive force calculated by the demanded drive force calculation portion 81.

The demanded drive force calculated by the demanded drive force calculation portion 81 is transferred to the engine control portion 54 of the processing portion 51 of the ECU 50. According to the demanded drive force, the engine control portion 54 controls the degree of opening of the throttle valve 18 via the throttle valve control portion 55 of the engine control portion 54, and also controls the ignition timing via the ignition timing control portion 56. Besides, the demanded drive force calculated by the demanded drive force calculation portion 81 is also transferred to the alternator load adjustment portion 59 of the processing portion 51 of the ECU 50. According to the demanded drive force, the alternator load adjustment portion 59 controls the amount of electricity generation of the alternator 24, thereby adjusting the alternator load. Therefore, the torque output from the engine 10 is caused to become a torque that can realize the demanded drive force.

Besides, the demanded drive force calculated by the demanded drive force calculation portion 81 is transferred also to the speed ratio shift control portion 57 of the processing portion 51 of the ECU 50. The speed ratio shift control portion 57, receiving the demanded drive force, performs a speed ratio shift control of the automatic transmission 35 so as to establish a speed change ratio that causes drive force generated by the driving wheels to be substantially equal to the demanded drive force when torque of the engine 10 is transferred to the driving wheels via the automatic transmission 35.

Besides, the vehicle control apparatus 80 in accordance with the second embodiment is able to perform the traction control and the vibration restraint control. In the traction control and the vibration restraint control, torque is increased or decreased within short time. Therefore, in the case where the control of torque is performed by the coordinated control combining the control of the degree of throttle opening and the control of the alternator load while the traction control or the like is being performed, the reduced amount of time needed for increasing or decreasing the alternator load contributes to the ability to control the torque without having a great adverse influence on the charge-discharge balance.

Incidentally, the torque decrease during the traction control is high in the degree of urgency. Therefore, in the case where the amount of control of the torque decrease achieved by employing only the control of the alternator load is not sufficient, the retardation control of the ignition timing is employed as well in order to realize the demanded torque at the time of the torque decrease. Besides, in the case where the control of the alternator load and the retardation control of the ignition timing are both employed in this manner, the torque decrease is performed through the control of the alternator load if, when the ignition timing retardation control is to be continually performed, the ignition timing retardation cannot be performed because a non-execution-of-timing-retardation time that is a time during which the ignition timing retardation control is not performed is less than or equal to a predetermined set time.

Figure 8:
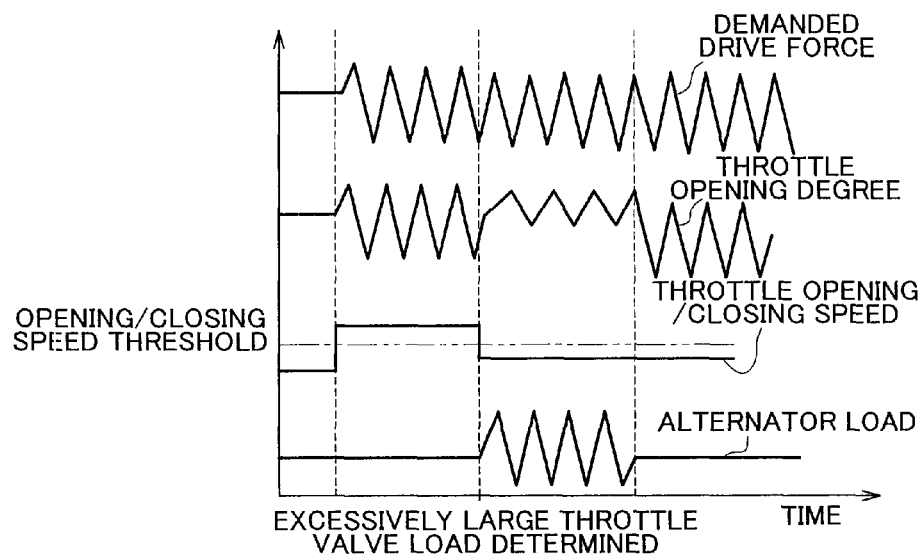
FIG. 8 is an illustrative diagram of the torque control performed when the demanded drive force frequently changes, in the vehicle control apparatus in accordance with the second embodiment.

FIG. 8 is an illustrative diagram of a torque control performed in the case where the demanded drive force frequently changes. The vehicle control apparatus 80 in accordance with the second embodiment controls the throttle valve 18 and the like by the demanded drive force that is calculated by the demanded drive force calculation portion 81. However, in the vehicle control apparatus 80 in accordance with the second embodiment, because the traction control or the vibration restraint control is performed, it sometimes happens that the magnitude of the demanded drive force frequently changes as shown in FIG. 8, depending on the state of travel of the vehicle 1. The throttle valve control portion 55 controls the throttle valve 18 to change the degree of throttle opening in order to realize the demanded drive force. If the magnitude of the demanded drive force frequently changes as mentioned above, the throttle valve control portion 55 frequently changes the degree of throttle opening by performing the opening/closing control of the throttle valve 18 according to the demanded drive force.

In the case where the degree of throttle opening is frequently changed in this manner, the throttle valve 18 is operated at high speed while the operating direction thereof is switched back and forth, so that the load of the throttle valve 18 becomes large. If the throttle valve 18 becomes as large as or larger than a predetermined load, the changing of the demanded drive force is supplemented by the control of the alternator load. That is, if, in the case where the degree of throttle opening is frequently changed, the frequency of the opening and closing motions of the throttle valve 18 becomes higher than or equal to a predetermined value or the change in the amplitude of the opening/closing motions becomes greater than or equal to a predetermined value, then the amount of control of the alternator load is increased.

Concretely, in the case where the throttle valve control portion 55 performs the opening/closing control of the throttle valve 18, the amount of control of the opening/closing control is transferred from the throttle valve control portion 55 to the throttle load determination portion 82 of the processing portion 51 of the ECU 50. The throttle load determination portion 82 then calculates an opening/closing speed of the throttle valve 18 under the opening/closing control, from the amount of control of the throttle valve 18 that is transferred thereto from the throttle valve control portion 55. After calculating the opening/closing speed of the throttle valve 18, the throttle load determination portion 82 compares the throttle opening/closing speed that is the opening/closing speed of the throttle valve 18 with a threshold value of the opening/closing speed that is stored in the storage portion 70 of the ECU 50, and then determines whether or not the throttle opening/closing speed has exceeded the threshold value of the opening/closing speed. Furthermore, if the throttle opening/closing speed exceeds the threshold value of the opening/closing speed, the throttle load determination portion 82 measures the time of the excess of the opening/closing speed. If the measured time of the excess becomes greater than or equal to a predetermined time, the throttle load determination portion 82 determines that the load of the throttle valve 18 is excessively large.

Incidentally, the threshold value of the opening/closing speed and the predetermined time used as a criterion for the time during which the throttle opening/closing speed is greater than the threshold value of the opening/closing speed are set beforehand as threshold values for use in the determination as to whether or not the load of the throttle valve 18 is excessively large, and are stored in the storage portion 70 of the ECU 50. Besides, as for this determination, it may also be determined that the load of the throttle valve 18 is excessively large, even in cases other than the case where the time during which the measured throttle opening/closing speed continues to be greater than the threshold value of the opening/closing speed exceeds the predetermined time. For example, a predetermined measurement time may be set for this determination, and then the load of the throttle valve 18 may be determined as being excessively large in the case where, within the set measurement time, the total of the amounts of time during each of which the throttle opening/closing speed is greater than the threshold value of the opening/closing speed becomes equal to or larger than a predetermined total amount of time that is set beforehand.

If the determination by the throttle load determination portion 82 shows that a condition for determining that the load of the throttle valve 18 is excessively large has been satisfied, that is, if it is determined by the throttle load determination portion 82 that the load of the throttle valve 18 is excessively large, the throttle load determination portion 82 transfers to the engine control portion 54 the information that the load of the throttle valve 18 is excessively large, by using a flag (not shown) that shows whether or not the load of the throttle valve 18 is excessively large.

The engine control portion 54, having received the information, isolates high-frequency components from the changes of the demanded drive force that frequently changes in magnitude, and assigns the high-frequency components for the control of the alternator load. Therefore, in the case where the torque output from the engine 10 is changed on the basis of the demanded drive force whose magnitude frequently changes, a part of the change of the torque is subjected to the control based on the changing of the alternator load.

That is, the engine control portion 54 performs the high-frequency isolation of the changes of the demanded drive force, and transfers the divided amounts of control to the throttle valve control portion 55 and to the alternator load adjustment portion 59. According to the amounts of control transferred, the throttle valve control portion 55 and the alternator load adjustment portion 59 control the amounts of control of the throttle valve 18 and the alternator 24. Therefore, the alternator load comes to change more frequently than before the load of the throttle valve 18 is determined as being excessively large. That is, the alternator load adjustment portion 59 frequently changes the alternator load if the load of the throttle valve 18 is determined as being excessively great. In other words, the alternator load adjustment portion 59 increases the amount of adjustment of the alternator load if the load of the throttle valve 18 becomes greater than or equal to a predetermined value.

On the other hand, with regard to the degree of throttle opening, the frequency of change and the amount of change in the degree of throttle opening become less than those occurring before the load of the throttle valve 18 is determined as being excessively large. In other words, the throttle valve control portion 55 reduces the amount of adjustment of the throttle valve 18 if the load of the throttle valve 18 becomes greater than or equal to a predetermined value. Due to this, the frequency of operation of the throttle valve 18 and the speed of the operation thereof become lower, so that the load of the throttle valve 18 declines.

The torque output from the engine 10 comes to have a magnitude obtained through the control based on the degree of throttle opening and the control based on the alternator load combined. Therefore, the torque output from the engine 10 is controlled by the amount of control combining the alternator load and the degree of throttle opening which each change in magnitude, and therefore frequently changes in magnitude. Due to this, in the case where the load of the throttle valve 18 is determined as being excessively large, the demanded drive force that frequency changes in magnitude is realized by the torque of the engine 10 that is frequency changed in magnitude due to the changes combining changes in the alternator load and changes in the degree of throttle opening.

After the load of the throttle valve 18 is determined as being excessively large and the engine 10 is operated for a predetermined time with the changes in the demanded drive force having been divided into changes to be caused by the degree of throttle opening and changes to be caused by the alternator load, the control of the torque from the engine 10 through the control of the alternator load ends, and the torque of the engine 10 is controlled again through the control of only the degree of throttle opening. That is, the demanded drive force is realized by employing only the control of the degree of throttle opening.

Figure 9:
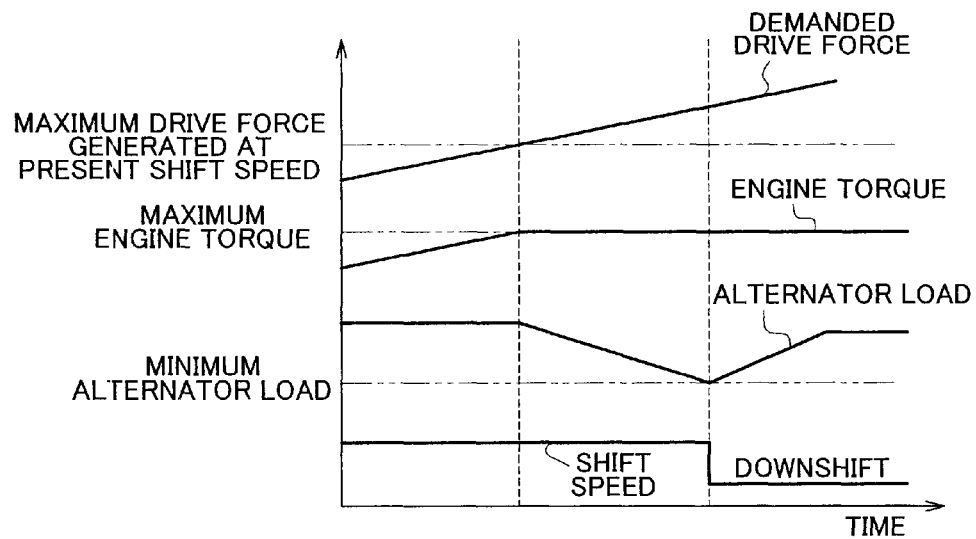
FIG. 9 is an illustrative diagram of the torque control performed in the case where a speed ratio shift control is performed when the demanded drive force increases, in the vehicle control apparatus in accordance with the second embodiment.

FIG. 9 is an illustrative diagram of the torque control performed in the case where the ratio shift control is performed when the demanded drive force is increased. Besides, although the torque of the engine 10 is changed according to the demanded drive force, the control of the alternator load can also be employed in order to control the torque output from the engine 10. Specifically, in the case where the alternator load is changed, the torque generated by burning fuel does not change. However, since the alternator load is a load that is given to the engine 10 during the electricity generation of the alternator 24, the changing of the alternator load will change the torque that is output from the engine 10 to the automatic transmission 35. Therefore, even in the case where the torque of the engine 10 is maintained, or in the case where the torque of the engine 10 is in an uncontrollable range, the magnitude of the torque output from the engine 10 can be changed by changing the alternator load.

For example, when the demanded drive force is increased, the engine torque that is the torque generated from energy provided by the combustion of fuel in the engine 10 is increased. However, since the engine torque is limited at its maximum torque thereof, increase in the maximum engine torque is not accompanied by any further increase in the engine torque if the engine torque has reached the maximum engine torque as shown in FIG. 9. In this case, even though the demanded drive force is increased, the actually generated drive force is a constant drive force unless the shift speed of the automatic transmission 35 is shifted. The drive force in this case is the maximum generated drive force at the present shift speed of the automatic transmission 35. In the case where the demanded drive force is increased but the engine torque has reached the maximum torque, the actually generated drive force cannot be increased any further. In that case, therefore, the vehicle control apparatus 80 in accordance with the second embodiment reduces the alternator load.

Concretely, in the case where the actual drive force is to be increased when the demanded drive force is increased, the engine torque generated by the engine 10 controlled by the engine control portion 54 according to the demanded drive force is estimated by the engine torque estimation portion 83 of the processing portion 51 of the ECU 50 on the basis of the degree of throttle opening, the ignition timing, the engine rotation speed, etc. The engine torque estimated by the engine torque estimation portion 83 is transferred to the engine torque determination portion 84 of the processing portion 51 of the ECU 50. Then, the engine torque determination portion 84 accordingly determines whether or not the engine torque has reached the maximum engine torque. Incidentally, the maximum engine torque that is used in this determination is set or estimated beforehand as a maximum torque of the engine 10 that is controlled by the vehicle control apparatus 80 in accordance with the second embodiment, and is stored in the storage portion 70 of the ECU 50. The engine torque determination portion 84 determines whether or not the engine torque has reached the maximum engine torque, by comparing the maximum engine torque stored in the storage portion 70 and the engine torque estimated by the engine torque estimation portion 83.

If it is determined by the engine torque determination portion 84 that the engine torque has reached the maximum engine torque, the engine torque determination portion 84 then transfers the information of the engine torque having reached the maximum engine torque to the alternator load adjustment portion 59, by using a flag (not shown) that shows whether or not the engine torque has reached the maximum engine torque.

The alternator load adjustment portion 59, having received the information, reduces the amount of electricity generation of the alternator 24 and therefore reduces the alternator load by controlling the regulator 25. Due to this, the load given from the alternator 24 to the engine 10 reduces, and therefore the torque output from the engine 10 to the automatic transmission 35 increases. Therefore, since the increased torque is transferred to the driving wheels via the automatic transmission 35, the drive force generated by the driving wheels increases, so that the actually generated drive force becomes larger than the maximum drive force that is generatable at the present shift speed of the automatic transmission 35.

The drive force generated by the driving wheels can be increased by decreasing the alternator load in the foregoing manner even when the engine torque has reached the maximum engine torque. Although the drive force generated by the driving wheels increases with decreases in the alternator load, the alternator load has a lower limit. Therefore, in the case where the torque output from the engine 10 is controlled by adjusting the alternator load, information about the alternator load that is adjusted by the alternator load adjustment portion 59 is acquired by the alternator load determination portion 85 of the processing portion 51 of the ECU 50, and the alternator load determination portion 85 determines whether or not the alternator load that is decreased through the adjustment performed by the alternator load adjustment portion 59 has reached a minimum alternator load that is the lower limit of the alternator load. Incidentally, the minimum alternator load that is used in this determination is estimated beforehand as a minimum load that can be given from the alternator 24 to the engine 10, and is stored in the storage portion 70 of the ECU 50.

If it is determined by the alternator load determination portion 85 that the alternator load, while is being decreased, has reached the minimum alternator load, the alternator load determination portion 85 transfers the information about the result of the determination to the alternator load adjustment portion 59 and to the speed ratio shift control portion 57, by using a flag (not shown). The alternator load adjustment portion 59, having received the information, increases the alternator load by increasing the amount of electricity generation of the alternator 24.

Besides, the speed ratio shift control portion 57, also having received the information, controls the automatic transmission 35 to shift the shift speed of the automatic transmission 35 to a lower-speed-side shift speed. That is, the speed ratio shift control portion 57 performs a downshift control of the automatic transmission 35. In the case where the shift speed of the automatic transmission 35 has been shifted to a lower-speed-side shift speed, since the torque transferred to the driving wheels via the automatic transmission 35 increases, the drive force generated by the driving wheels becomes larger than the drive force generated prior to the downshift. Therefore, the drive force that is actually generated by the driving wheels becomes a drive force that is close in magnitude to the demanded drive force provided at the time of increase.

That is, in the case where the drive force generated by the driving wheels is increased by increasing the demanded drive force, the alternator load adjustment portion 59 reduces the alternator load if the torque output from the engine 10 reaches the maximum engine torque. Besides, if the engine torque has reached the maximum engine torque in this manner, the speed ratio shift control portion 57 reduces the alternator load via the alternator load adjustment portion 59 so as to postpone the timing of the downshift, that is, the timing of shifting the speed change ratio of the automatic transmission 35, to a timing that is later than the timing of the downshift adopted in the case where the alternator load is not reduced.

Figure 10:
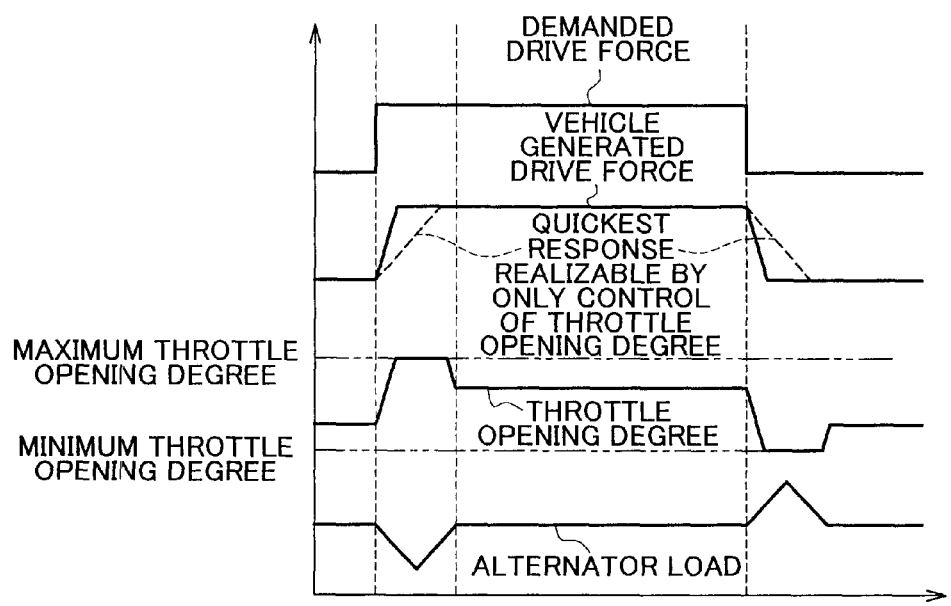
FIG. 10 is an illustrative diagram of a the control of the throttle opening and the control of the alternator load performed when the demanded drive force changes, in the vehicle control apparatus in accordance with the second embodiment.

FIG. 10 is an illustrative diagram of a coordinated control combining the control of the degree of throttle opening and the control of the alternator load which is performed when the demanded drive force is changed. Besides, when the demanded drive force changes, the torque output from the engine 10 is changed mainly by changing the degree of throttle opening. However, the intake air amount that can be changed by changing the degree of throttle opening is limited. Therefore, in the case where the torque output from the engine 10 is changed by only changing the degree of throttle opening, a delay occurs in the change of the engine torque if the demanded amount of change or the demanded rate of change of the engine torque occurring when the engine torque is changed with changes in the demanded drive force is greater than the amount of change or the rate of Change of the engine torque that can be realized by only changing the degree of throttle opening. Therefore, in the case where the rate of change in the demanded drive force is fast, it sometimes happens that the foregoing delay makes it difficult to cause the vehicle generated drive force that is a drive force actually generated by the driving wheels to follow the demanded drive force. Hence, in this case, the control of the alternator load is also employed to perform the coordinated control combining the control of the alternator load and the control of the degree of throttle opening.

For example, in the case where the demanded drive force is sharply increasing, the throttle valve 18 is controlled by the throttle valve control portion 55 so that the degree of throttle opening is increased to a maximum degree of throttle opening that is an upper limit for the time of increasing the degree of throttle opening. Besides, simultaneously, the amount of electricity generation of the alternator 24 is controlled by the alternator load adjustment portion 59 so as to reduce the amount of electricity generation and therefore decrease the alternator load.

Thus, when the degree of throttle opening is brought to the maximum degree of throttle opening, the torque generated by the engine 10 rises at a rate of change that can be achieved by the maximum degree of throttle opening. Besides, in the case where the alternator load is decreased, the torque output from the engine 10 to the automatic transmission 35 increases since, of the torque that the engine 10 generates by burning fuel, the amount of torque consumed for driving the alternator 24 decreases. Therefore, a sharp increase occurs in the vehicle generated drive force that is a drive force actually generated by the driving wheels when the foregoing torque is transferred to the driving wheels.

The rate of the foregoing increase is faster than the rate of increase in the vehicle generated drive force which is achieved by only increasing the degree of throttle opening since the rate of the foregoing increase is a rate of increase achieved when the vehicle generated drive force is increased by a combination of the amount of increase achieved by increasing the degree of throttle opening and the amount of increase achieved by decreasing the alternator load. That is, the response speed achieved when the vehicle generated drive force is increased by setting the degree of throttle opening to the maximum degree of throttle opening and decreasing the alternator load is higher than the highest response speed that can be realized by only the adjustment of the degree of throttle opening. Therefore, in the case where the vehicle generated drive force is increased by performing the coordinated control combining the control of the degree of throttle opening and the control of the alternator load, the vehicle generated drive force increases to a drive force substantially equal to the demanded drive force in a shorter time following the start of the control than in the case where the vehicle generated drive force is increased by employing only the control of the degree of throttle opening.

After the vehicle generated drive force is brought to a drive force substantially equal to the demanded drive force in a short time by performing the coordinated control combining the control of the degree of throttle opening and the control of the alternator load, the degree of throttle opening and the alternator load are both brought to amounts of control that are suitable to the demanded drive force.

Besides, if the demanded drive force sharply decreases, the degree of throttle opening is lessened to a minimum degree of throttle opening that is a lower limit set for the time of decreasing the degree of throttle opening, by controlling the throttle valve 18 via the throttle valve control portion 55. Besides, simultaneously, the amount of electricity generation of the alternator 24 is controlled via the alternator load adjustment portion 59 so as to increase the amount of electricity generation and therefore increase the alternator load.

Thus, in the case where the degree of throttle opening is set to the minimum degree of throttle opening, the torque generated by the engine 10 decreases at a rate of change that can be achieved with the minimum degree of throttle opening. Besides, in the case where the alternator load is increased, since the engine torque used to drive the alternator 24 increases, the torque output from the engine 10 to the automatic transmission 35 reduces. Therefore, the vehicle generated drive force sharply reduces. The rate of this reduction is faster than the rate of reduction in the vehicle generated drive force which is achieved by only lessening the degree of throttle opening since the rate of the foregoing reduction is a rate of reduction achieved when the vehicle generated drive force is reduced by a combination of the amount of reduction achieved by lessening the degree of throttle opening and the amount of reduction achieved by increasing the alternator load.

That is, the response speed achieved when the vehicle generated drive force is reduced by setting the degree of throttle opening to the maximum degree of throttle opening and increasing the alternator load is higher than the highest response speed that can be realized through only the adjustment of the degree of throttle opening. Therefore, in the case where the vehicle generated drive force is reduced by performing the coordinated control combining the control of the degree of throttle opening and the control of the alternator load, the vehicle generated drive force reduces to a drive force substantially equal to the demanded drive force in a shorter time following the start of the control than in the case where the vehicle generated drive force is reduced by employing only the control of the degree of throttle opening. Therefore, for example, at the time of torque increase from the vicinity of a fully-open throttle state, or the time of torque decrease from a completely-closed throttle state, if the coordinated control combining the control of the degree of throttle opening and the control of the alternator load is performed, the response time elapsing until the demanded torque is realized becomes shorter than the response time that is needed in the case where the torque control is performed through only the control of the degree of throttle opening.

The foregoing vehicle control apparatus 80 is able to improve endurance since the apparatus 80 increases the amount of adjustment of the alternator load via the alternator load adjustment portion 59 if the load of the throttle valve 18 becomes equal to or greater than a predetermined load when the demanded drive force is to be realized by opening/closing the throttle valve 18. That is, the throttle valve 18 is provided so as to be readily opened and closed, due to portions that support the throttle valve 18, such as a rotation shaft (not shown), a bearing portion (not shown) that supports the rotation shaft, etc., and drive means for operating the throttle valve 18, such as an electric motor (not shown) or the like. However, in the case where the amount of change in the opening/closing of the throttle valve 18, the frequency of opening/closing the throttle valve 18 or the opening/closing speed thereof is large, the load on the portions that support the throttle valve 18 and the drive means becomes large. Therefore, in the case where the magnitude of the demanded drive force frequently changes, if the degree of throttle opening is frequently changed for the purpose of realizing the demanded drive force, large load acts on the portions that support the throttle valve 18 and the drive means of the throttle valve 18.

Therefore, if the foregoing load on the portions that support the throttle valve 18 and the drive means of the throttle valve 18 becomes greater than or equal to a predetermined load, the amount of adjustment of the alternator load is increased, so that changes in the demanded drive force can be made up for by changing the alternator load, and therefore the amount of change in the opening/closing of the throttle valve 18, the frequency of the opening/closing thereof, the speed of the opening/closing thereof can be correspondingly reduced. As a result, even in the case where the demanded drive force changes greatly, the demanded drive force can be still more certainly achieved, and the endurance of the throttle valve 18 can be improved.

Besides, the foregoing feature restrains a drawback that occurs in the case where the coordinated control combining the control of the alternator load and the opening/closing control of the throttle valve 18 is performed. As a result, it is possible to more appropriately perform the coordinated control combining the control of the alternator load that is performed for controlling the output of the engine 10, and the opening/closing control of the throttle valve 18, which is a control other than the alternator load control.

Besides, when the drive force generated by the driving wheels is to be increased for the purpose of realizing the demanded drive force in the case where the demanded drive force is increasing, the alternator load adjustment portion 59 reduces the alternator load if the engine torque reaches the maximum engine torque. Due to this, even during the state in which, due to the engine torque reaching the maximum engine torque, the drive force has reached the maximum generated drive force that is achievable at the present shift speed, and therefore the drive force cannot be increased any further by increasing the engine torque, it is possible to increase the torque output from the engine 10 to the automatic transmission 35 by reducing the engine torque that is used to drive the alternator 24. Hence, even in the case where the engine torque has reached the maximum engine torque, the actual drive force can be increased in accordance with increases in the demanded drive force, without a need to shift the shift speed of the automatic transmission 35 to a lower speed side.

Besides, in the case where the alternator load, when reduced by the alternator load adjustment portion 59, reaches the minimum alternator load, the alternator load cannot be reduced any further, so that the drive force cannot be increased by reducing the alternator load. Therefore, in this case, the shift speed of the automatic transmission 35 is shifted to a lower-speed-side shift speed. That is, a downshift is performed. Due to this, when the torque output from the engine 10 is transferred to the driving wheels, the torque transferred thereto is larger than that transferred thereto prior to the downshift, and thus the drive force is increased.

Besides, in the case where the demanded drive force is increasing, if the drive force reaches the maximum generated drive force achievable at the present shift speed due to the engine torque becoming equal to the maximum engine torque while the alternator load is not reduced, the speed ratio shift control portion 57 does not shift the speed change ratio of the automatic transmission 35 but reduces the alternator load, and then performs a downshift control after the alternator load reaches the minimum alternator load. Therefore, the speed ratio shift control portion 57 is able to postpone the timing of shifting the speed change ratio of the automatic transmission 35 to a timing that is later than the shift timing that is set in the case where the alternator load is not reduced, so that the opportunities of performing a downshift can be decreased. Due to this, the shift shock at the time of shifting the speed change ratio, and a shift-busy state due to the frequent shifting of the speed change ratio can be restrained. As a result, it is possible to improve comfort of the vehicle 1 during the traveling thereof while further certainly achieving the demanded drive force.

Besides, the foregoing feature makes it possible to improve the effectiveness of the control in the case where the coordinated control combining the control of the alternator load and the control of the degree of throttle opening which controls the torque output from the engine 10, etc. As a result, it is possible to more precisely perform the coordinated control combining the control of the alternator load for controlling the output of the engine 10, and the control of the degree of throttle opening, which is a control other than the alternator load control.

Besides, the amount of adjustment of the alternator load is increased if the degree of throttle opening needed in order to realize the demanded drive force exceeds the maximum degree of throttle opening or the minimum degree of throttle opening as the demanded drive force sharply changes, that is, if the demand for adjustment of the engine torque exceeds a range that is achievable by adjusting the intake air amount via the throttle valve 18 as the demanded drive force sharply changes. The range of adjustment of the intake air amount via the throttle valve 18 has a limit. Normally, the intake air amount is adjusted within this limited range when the engine torque is to be adjusted. Concretely, the intake air amount is adjusted by controlling the degree of throttle opening between the maximum degree of throttle opening and the minimum degree of throttle opening. Therefore, if the intake air amount needed for the demanded torque of the engine 10 exceeds the range of intake air amount achievable by the degree of throttle opening between the maximum degree of throttle opening and the minimum degree of throttle opening, in other words, if the demanded torque of the engine 10 exceeds the torque achievable by the intake air amount provided by the maximum degree of throttle opening or the minimum degree of throttle opening, the amount of adjustment of the alternator load is increased.

Due to this, if the torque demanded of the engine 10 exceeds the range achievable by adjusting the degree of throttle opening, the torque demanded of the engine 10 is achieved by increasing the amount of adjustment of the alternator load in such a direction that the torque output from the engine 10 can be changed so as to achieve the demanded torque. Therefore, in the case where the demanded drive force sharply changes, the vehicle generated drive force generated by the torque output from the engine 10 becomes a drive force that is generated by the torque achieved by only the adjustment of the degree of throttle opening and the torque achieved by increasing the amount of adjustment of the alternator load; therefore, this vehicle generated drive force can be achieved at an earlier stage than the drive force achievable by only the adjustment of the degree of throttle opening. As a result, the demanded drive force can be even more certainly attained regardless of the state of change of the demanded drive force.

Besides, the foregoing feature makes it possible to improve the degree of fulfillment of the demand in the case where the coordinated control combining the control of the alternator load and the control of the degree of throttle opening is performed according to the demanded torque. As a result, it becomes possible to more appropriately perform the coordinated control combining the control of the alternator load that is performed for controlling the output of the engine 10, and the control of the degree of throttle opening, which is a control other than the alternator load control.

Figure 11:
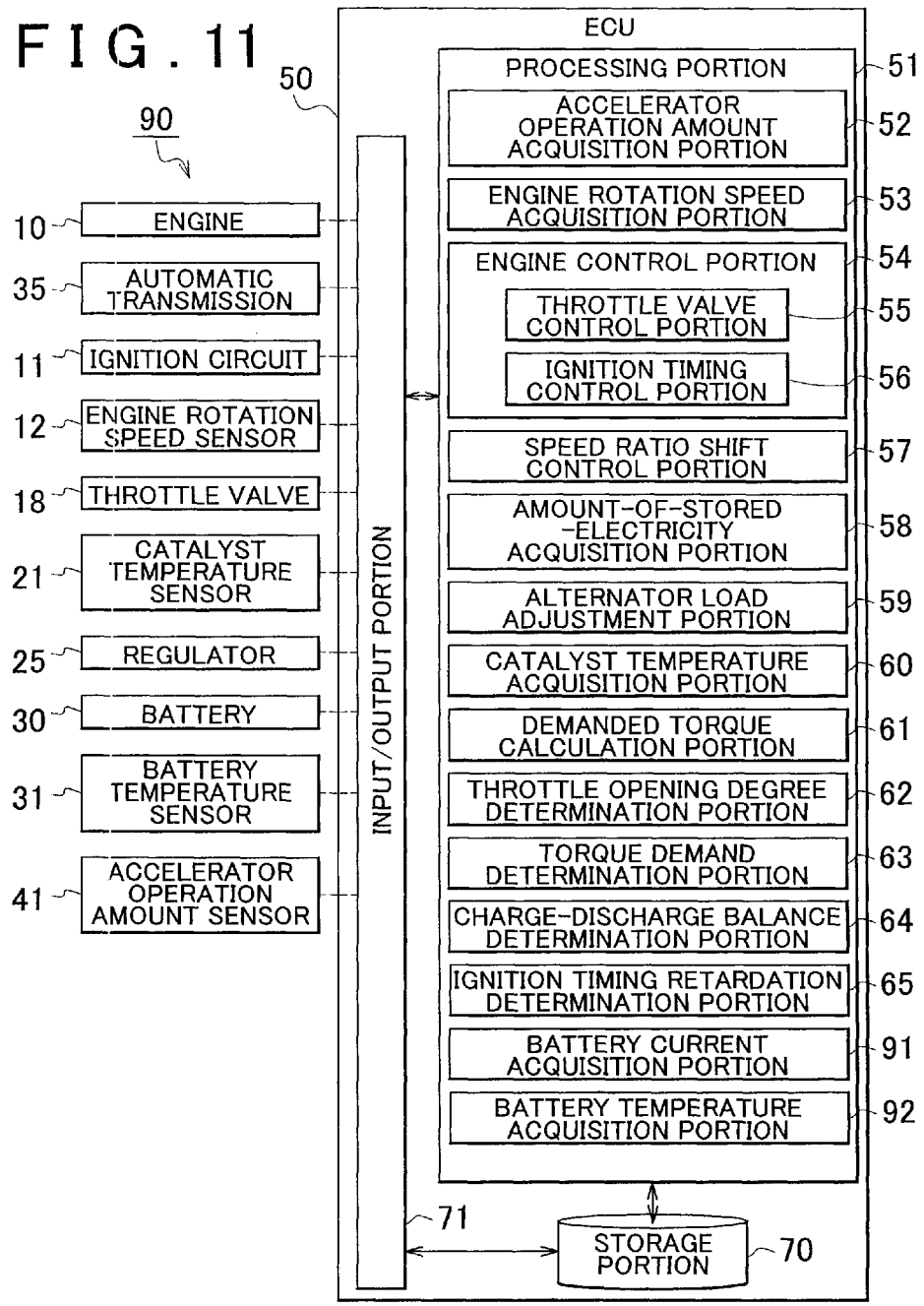
FIG. 11 is a construction diagram of portions of a vehicle control apparatus in accordance with a third embodiment.

A vehicle control apparatus 90 in accordance with a third embodiment of the invention has substantially the same construction as the vehicle control apparatus 2 in accordance with the first embodiment, but is characterized in that, at the time of controlling the alternator load for the purpose of controlling the torque output from an engine 10, the alternator load is controlled on the basis of the state of a battery 30. Other constructions of this embodiment are substantially the same as those of the first embodiment, and are represented by the same reference characters while descriptions thereof are omitted below. FIG. 11 is a construction diagram of portions of the vehicle control apparatus in accordance with the third embodiment. The vehicle control apparatus 90 in accordance with the third embodiment, similar to the vehicle control apparatus 2 in accordance with the first embodiment, is able to perform a coordinated control of the torque output from the engine 10 through the coordinated control combining the control of the alternator load and the retardation control of the ignition timing.

The vehicle control apparatus 90 in accordance with the third embodiment has an ECU 50 that controls various portions, as in the vehicle control apparatus 2 in accordance with the first embodiment. A processing portion 51 of the ECU 50 has an accelerator operation amount acquisition portion 52, an engine rotation speed acquisition portion 53, an engine control portion 54, a throttle valve control portion 55, an ignition timing control portion 56, a speed ratio shift control portion 57, an amount-of-stored-electricity acquisition portion 58, an alternator load adjustment portion 59, a catalyst temperature acquisition portion 60, a demanded torque calculation portion 61, a throttle opening degree determination portion 62, a torque demand determination portion 63, a charge-discharge balance determination portion 64, and an ignition timing retardation determination portion 65.

Furthermore, the processing portion 51 has an battery current acquisition portion 91 that is an electric power consumption acquisition portion that acquires the battery current that is an electric current that flows from the battery 30 to various electrical component parts, and a battery temperature acquisition portion 92 that is an electricity storage device temperature acquisition portion that acquires the temperature of the battery 30 from a result of detection provided by a battery temperature sensor 31.

The vehicle control apparatus 90 in accordance with the third embodiment is constructed as described above. Operation of the apparatus 90 will be described below. When controlling the torque output from the engine 10, the vehicle control apparatus 90 in accordance with the third embodiment, similar to the vehicle control apparatus 2 in accordance with the first embodiment, controls the torque output from the engine 10 by adjusting the alternator load if the demanded torque cannot be achieved through only the control of the degree of throttle opening. Although the alternator 24 is used to control the torque of the engine 10, the primary function of the alternator 24 is to generate electricity by using torque generated by the engine 10. Therefore, the vehicle control apparatus 90 in accordance with the third embodiment, when controlling the torque output from the engine 10 by adjusting the alternator load, performs the control while factoring in the state of the battery 30 that stores electricity generated by the alternator 24.

Figure 12:
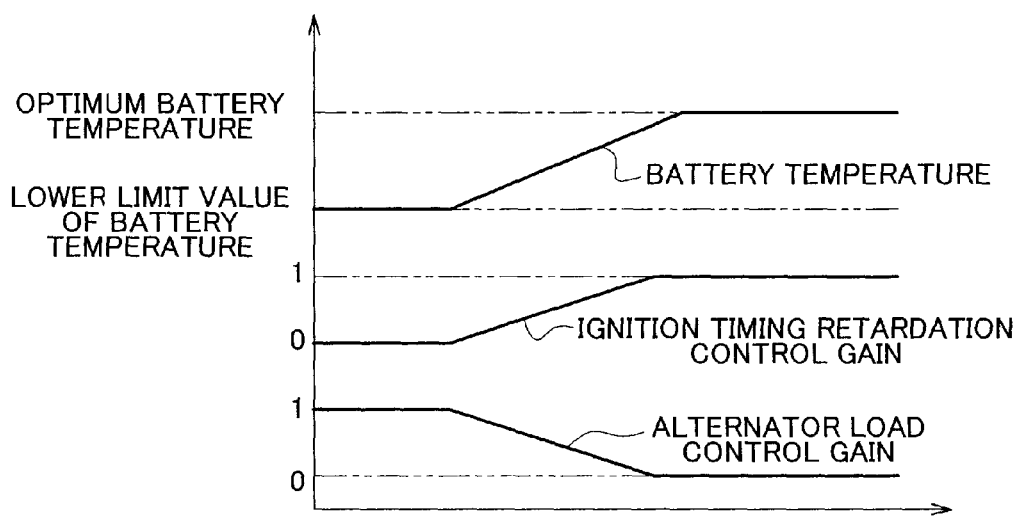
FIG. 12 is an illustrative diagram for the gains of the retardation control of the ignition timing and the control of the alternator load relative to the battery temperature, in the vehicle control apparatus in accordance with the third embodiment.

FIG. 12 is an illustrative diagram of the gains of the retardation control of the ignition timing and the control of the alternator load relative to the battery temperature. Various controls performed when the vehicle control apparatus 90 in accordance with the third embodiment controls the torque in conjunction with the demanded torque while the vehicle is travelling. For example, in the case where a coordinated control combining the retardation control of the ignition timing and the control of the alternator load is performed on the basis of the state of the battery 30, the temperature of the battery 30 is also taken into consideration. That is, since the battery 30 declines in the charging efficiency in the case where temperature is low, the amount of electricity generated by the alternator 24 is increased if the battery temperature that is the temperature of the battery 30 declines.

Concretely, when the torque control through the control of the alternator load and the retardation control of the ignition timing is to be performed on the basis of the battery temperature, the battery temperature is acquired by the battery temperature acquisition portion 92 of the processing portion 51 of the ECU 50. Since the battery 30 is provided with the battery temperature sensor 31, the battery temperature acquisition portion 92 acquires the battery temperature by acquiring detection results provided by the battery temperature sensor 31. The alternator load adjustment portion 59 and the ignition timing control portion 56 adjust the amounts of control on the basis of the battery temperature acquired via the battery temperature acquisition portion 92.

That is, in the case where the battery temperature is relatively low, the charging efficiency declines, so that there is a need to increase the amount of electricity generation of the alternator 24. Therefore, if the battery temperature becomes lower than a predetermined temperature in the case where the torque is controlled through the control of the alternator load and/or the retardation control of the ignition timing, the amount of electricity generation of the alternator 24 is increased. That is, the alternator load is increased. Besides, in the case where the alternator load is increased in this manner, there occurs increase in the amount of change in the torque that occurs when the torque is controlled by controlling the alternator load, and therefore the amount of increase in the amount of change is compensated by changing the amount of retardation of the ignition timing.

Specifically, if the battery temperature acquired by the battery temperature acquisition portion 92 is lower than the optimum battery temperature that is a temperature at which the electricity generated by the alternator 24 can be efficiently charged into the battery 30, the alternator load adjustment portion 59 increases the alternator load control gain as the battery temperature declines as shown in FIG. 12. Thus, the alternator load control gain that is increased with decreases in the battery temperature is set so as to become "1" when the battery temperature reaches the vicinity of a lower limit value of the battery temperature which is a temperature at which the amount of electricity generation of the alternator 24 needs to be maximum, and so as to become "0" when the battery temperature reaches the vicinity of an optimum battery temperature.

Besides, as shown in FIG. 12, the ignition timing control portion 56 decreases the ignition timing retardation control gain with decreases in the battery temperature below the optimum battery temperature. The ignition timing retardation control gain is set so as to decline with increases in the alternator load control gain in order to compensate decreases in the torque output from the engine 10 which is reduced by increasing the alternator load control gain when the battery temperature declines, and is set so as to become zero when the alternator load control gain becomes close to "1".

In the case where when the demanded torque cannot be achieved through only the control of degree of throttle opening, the control of the torque is supplemented with the coordinated control combining the retardation control of the ignition timing and the control of the alternator load, if the battery temperature declines, the alternator load control gain is increased with decreases in the battery temperature. Due to this, the amount of electricity generation of the alternator 24 is increased to increase the current that flows from the alternator 24 to the battery 30, so that an amount of electricity stored in the battery 30 is secured despite the decreased charging efficiency of the battery 30 that is caused by decrease in the battery temperature.

Besides, in the case where the amount of electricity generation of the alternator 24 is increased as described above, the alternator load increases, so that the torque output from the engine 10 declines. However, when the alternator load control gain is increased, the ignition timing retardation control gain is decreased as the alternator load control gain is increased. In the case where the ignition timing retardation control gain is decreased, the amount of retardation of the ignition timing reduces, so that the amount of control of the torque decrease caused by retarding the ignition timing also declines.

That is, if the battery temperature declines, the amount of electricity generation of the alternator 24 is increased to increase the load given from the alternator 24 to the engine 10, so that the torque output from the engine 10 to the automatic transmission 35 reduces. In this case, the amount of retardation of the ignition timing is reduced, so that the amount of control of the torque decrease caused by the ignition timing retardation control is decreased. Due to this, the amount of decrease in the torque output from the engine 10 to the automatic transmission 35 which decreases due to the increase in the alternator load that occurs when the amount of electricity generation of the alternator 24 is increased can be compensated by reducing the amount of retardation of the ignition timing. Therefore, the torque output from the engine 10 becomes close to the demanded torque.

As described above, in the case where the retardation control of the ignition timing and/or the control of the alternator load is performed according to the battery temperature, if the battery temperature is lower than the optimum battery temperature, the alternator load is increased to increase the amount of electricity generation in order to secure an amount of stored electricity of the battery 30 whose charging efficiency has declined. In this manner, the torque control can be appropriately performed while good charge-discharge balance is obtained.

Figure 13:
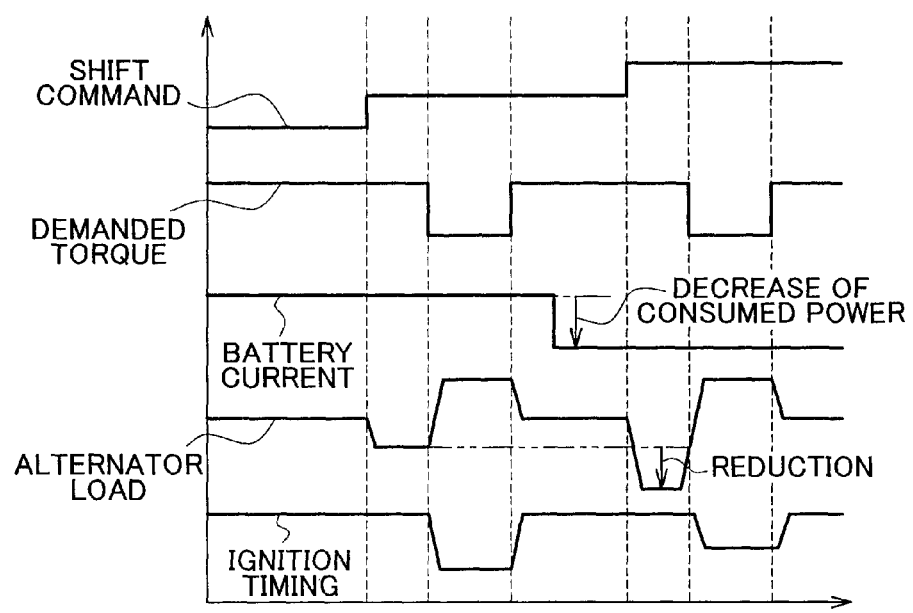
FIG. 13 is an illustrative diagram for the case where the alternator load as well as the battery current is controlled, taking into consideration the state of the battery current at the time of a speed ratio shift of an automatic transmission, in the vehicle control apparatus in accordance with the third embodiment.

FIG. 13 is an illustrative diagram for the case where at the time of shifting the speed change ratio of the automatic transmission, the alternator load is controlled with the state of the battery current factored in. Besides, if after an upshift control is performed according to a command to shift the shift speed that is output from the speed ratio shift control portion 57 of the processing portion 51 of the ECU 50, there is no change in the demanded torque and there is no large change in the battery current that is the current that flows from the battery 30 to various electrical component parts, the alternator load adjustment portion 59 of the processing portion 51 of the ECU 50 reduces the amount of electricity generation of the alternator 24. Due to this, the alternator load also reduces. That is, the alternator load adjustment portion 59 reduces the alternator load provided that a torque equal in magnitude to the demanded torque can be output from the engine 10 even if the alternator load is reduced, that is, provided that the demanded torque can be achieved even if the alternator load is reduced. Due to this, the load from the alternator 24 to the engine 10 is reduced. Besides, if there is no change in the demanded torque, the ignition timing control portion 56 of the engine control portion 54 sets a substantially constant ignition timing.

If the demanded torque declines from the foregoing state, the alternator load adjustment portion 59 controls the alternator 24 through controlling the regulator 25 so as to increase the amount of electricity generation of the alternator 24, in order to achieve the demanded torque. Due to this, the alternator load given from the alternator 24 to the engine 10 when electricity is generated by the alternator 24 also increases. Besides, in this case, the ignition timing is retarded by controlling the ignition circuit 11 via the ignition timing control portion 56. If the demanded torque declines, the alternator load is increased and the ignition timing is retarded so that the torque output from the engine 10 is decreased to a torque that is substantially equal to the demanded torque.

Thus, when the demanded torque, after having declined, increases back to the previous magnitude, the alternator load adjustment portion 59 increases the alternator load back to the previous magnitude, and the ignition timing control portion 56 advances the ignition timing to the previous ignition timing.

After the vehicle 1 is moved in the foregoing state and an upshift is performed according to an upshift command that is output from the speed ratio shift control portion 57, the alternator load adjustment portion 59 reduces the amount of electricity generation of the alternator 24 again to reduce the alternator load. At that time, in the case where the electric power consumption of the electrical component parts decreases and the battery current declines during the period from the previous shift of the speed change ratio to the present shift of the speed change ratio, the alternator load adjustment portion 59 reduces the alternator load more greatly than the portion 59 reduces the alternator load in the case where the electric power consumption does not decrease and therefore the battery current is higher than the present battery current.

Concretely, the battery current is acquired via the battery current acquisition portion 91 of the processing portion 51 of the ECU 50, and the battery current acquisition portion 91 transfers the acquired battery current to the alternator load adjustment portion 59. The alternator load adjustment portion 59, having received the battery current, estimates the electric load from the battery current, and then determines according to the estimated electric load whether or not the alternator load can be reduced on the basis of whether or not the torque equal in magnitude to the demanded torque can be output from the engine 10 even if the alternator load is reduced. If this determination shows that the alternator load can be reduced, the alternator load is made smaller the less the battery current is, and the smaller the electric load is, that is, the less the electric power consumption is. If the demanded torque declines from this state, the alternator load adjustment portion 59 increases the alternator load again in order to achieve the demanded torque.

In this case, the alternator load is increased to the same magnitude of the alternator load that is reached in the case where the alternator load is increased by decreasing the demanded torque after the alternator load is reduced in the case where the battery current is greater than the present battery current. That is, in the case where the alternator load is to be increased when the demanded torque has decreased, the alternator load is increased to a predetermined magnitude regardless of the magnitude of the electric power consumption or the magnitude of the alternator load prior to the increase.

Thus, when the demanded torque has declined, the alternator load is increased to a predetermined magnitude in this manner. Before the alternator load is increased, the alternator load is in a reduced state. As for this reduction of the alternator load, the alternator load is made less the smaller the electric power consumption. Therefore, the amount of increase in the alternator load that is made when the alternator load is increased due to increase in the demanded torque, that is, the amount of control of the alternator load, is larger when the electric power consumption is relatively small than when the electric power consumption is relatively large.

Therefore, in the case where the demanded torque has decreased and the decreased demanded torque is to be achieved by the control of the alternator load and the retardation control of the ignition timing, the amount of increase in the alternator load, if it is increased, becomes larger the smaller the electric power consumption is, so that, relatively, the amount of retardation of the ignition timing becomes less the smaller the electric power consumption is. That is, in the case where the demanded torque has decreased, the rate of contribution of the alternator load to the achievement of the decreased demanded torque through the coordinated control combining the control of the alternator load and the retardation control of the ignition timing becomes larger the smaller the electric power consumption is. When the once-decreased demanded torque has temporarily returned to the previous magnitude, the alternator load adjustment portion 59 and the ignition timing control portion 56 return the alternator load and the ignition timing to the previous states.

The foregoing vehicle control apparatus 90, when controlling the torque output from the engine 10 through the coordinated control combining the retardation control of the ignition timing and the control of the alternator load, increases the alternator load via the alternator load adjustment portion 59 and reduces the retardation of the ignition timing via the ignition timing control portion 56 if the battery temperature acquired by the battery temperature acquisition portion 92 decreases. That is, in the case where the battery temperature declines, the charging efficiency of the battery 30 also declines, so that the amount of electricity stored into the battery 30 declines even though electricity generated by the alternator 24 is supplied to the battery 30. Therefore, in this case, the alternator load is increased to increase the amount of electricity generation performed by the alternator 24 and therefore increase the amount of electricity supplied to the battery 30, so that an amount of stored electricity in the case of decreased charging efficiency is secured.

Besides, in the case where the alternator load is increased as described above, the amount of control during the control of torque decrease also increases, so that the torque is likely to decrease more than necessary. However, excessive decrease of the torque output from the engine 10 can be restrained by reducing the amount of retardation of the ignition timing controlled by the ignition timing control portion 56 in accordance with decreases in the battery temperature. That is, the increase in the amount of torque decrease that has been caused by the alternator load being increased with decreases in the battery temperature can be compensated by the retardation control of the ignition timing. As a result, it becomes possible to more appropriately perform the coordinated control combining the control of the alternator load performed for controlling the output from the engine 10, and the retardation control of the ignition timing.

Besides, when the coordinated control combining the retardation control of the ignition timing and the control of the alternator load is performed, the amount of electricity generation of the alternator 24 is changed according to the battery temperature, and the change in the amount of control of torque decrease which is caused by change in the alternator load which is associated with the change in the amount of electricity generation of the alternator 24 is compensated by performing the retardation control of the ignition timing. Therefore, in the case where the battery temperature has decreased and the charging efficiency has decreased, it is possible to achieve the demanded torque while making appropriate the amount of electricity supplied to the battery 30. As a result, it is possible to realize a desired state of engine operation while securing an amount of stored electricity of the battery 30 in the case where the battery temperature has decreased.

Besides, a optimum battery temperature is set as a temperature of the battery 30 at which the battery 30 can be efficiently charged with electricity generated by the alternator 24. If the battery temperature acquired by the battery temperature acquisition portion 92 is lower than the optimum battery temperature, the alternator load adjustment portion 59 increases the alternator load. Therefore, the battery can be more certainly charged according to the battery temperature. That is, if the battery temperature decreases, the alternator load is increased. In the case where the alternator load is increased at the time of control of torque decrease, there is a need to control the amount of retardation of the ignition timing as well, because the amount of control of torque decrease provided by the control of the alternator load increases. Therefore, in the case where the alternator load is increased at an early stage in association with the battery temperature, there is a need to reduce the amount of retardation of the ignition timing at an early stage in order to restrain the amount of control of torque decrease from excessively increasing. Therefore, in the case where the torque is controlled with the battery temperature taken into account, the battery temperature acquired by the battery temperature acquisition portion 92 and the optimum battery temperature are compared. If the acquired battery temperature is lower than the optimum battery temperature, the alternator load is increased, so that the opportunities of performing the torque control through the coordinated control combining the retardation control of the ignition timing and the control of the alternator load can be reduced. As a result, it becomes possible to more appropriately and easily perform the control of the torque and the securement of the amount of stored electricity of the battery 30 in the case where the battery temperature has decreased.

Besides, while the engine 10 is cold, the ignition timing retardation control is performed in order to quickly warm up the catalyst 20. Therefore, when the engine 10 is cold, the amount of control allowed when the ignition timing retardation control is to be performed for the purpose of performing the control of torque is limited. Besides, when the engine 10 is cold, the temperature of the battery 30 is also low. Besides, if the battery temperature declines, the vehicle control apparatus 90 in accordance with the third embodiment increases the alternator load and reduces the amount of retardation of the ignition timing. Thus, on the basis of the decline of the charging efficiency due to low battery temperature during a cold state of the engine 10, the amount of retardation of the ignition timing is reduced. During the cold state of the engine 10, the amount of control in the ignition timing retardation control is also restricted as described above. Therefore, in this case, it is possible to appropriately perform both the control during the cold state of the engine 10 and the control performed in the case where the charging efficiency is low due to decline of the battery temperature. As a result, it becomes possible to more appropriately and easily perform the securement of an amount of stored electricity of the battery 30 and the control of the torque in the case where the battery temperature has declined, and to more appropriately and easily perform the operation control of the engine 10 during its cold state.

Besides, if a torque equal in magnitude to the demanded torque during the traveling of the vehicle 1 can be output from the engine 10 even in the case where the alternator load has been reduced, the alternator load is made smaller the less the electric power consumption. If from this state, the demanded torque declines, the alternator load is increased according to the demanded torque, regardless of the electric power consumption. Thus, if the demanded torque can be realized even in the case where the alternator load has been reduced, the alternator load is reduced beforehand. Therefore, the alternator load can more certainly be increased even in the case where the alternator load needs to be increased in order to decrease the torque output from the engine 10. Therefore, the demanded torque can be more certainly achieved.

Besides, in the case where the ignition timing is retarded, the temperature of the catalyst 20 rises. Therefore, after the ignition timing retardation control is performed, the ignition timing retardation control cannot be performed again until a predetermined time elapses. Therefore, the alternator load is reduced beforehand to allow an ample amount by which the alternator load can be increased. Thus, in the case where the demanded torque has decreased, the torque can be controlled by increasing the alternator load without considerable performance of the retardation control of the ignition timing. Due to this, it becomes possible to more certainly achieve the demanded torque while restraining the temperature of the catalyst 20 from increasing. As a result, it is possible to more appropriately perform the coordinated control combining the control of the alternator load for controlling the output of the engine 10, and the retardation control of the ignition timing that is a control other than the alternator load control.

Besides, the controls performed by the vehicle control apparatus 80 in accordance with the second embodiment and the vehicle control apparatus 90 in accordance with the third embodiment may be singly performed irrespective of the controls that are executable by the vehicle control apparatus 2 in accordance with the first embodiment. In the case where the controls by the vehicle control apparatus 80 in accordance with the second embodiment and the vehicle control apparatus 90 in accordance with the third embodiment are singly performed irrespective of the controls executable by the vehicle control apparatus 2 in accordance with the first embodiment, the foregoing effects can be attained, and it is possible to more appropriately perform the coordinated control combining the control of the load torque of the alternator 24 employed for controlling the output from the engine 10, and a control other than the load torque control.

Besides, although the vehicle control apparatus 80 in accordance with the second embodiment is described above in conjunction with the control of decreasing the alternator load if the engine torque reaches the maximum torque when the demanded drive force increases (see FIG. 9), a similar control may also be performed when the demanded drive force is decreasing. That is, in the case where the engine torque is decreased due to decrease in the demanded drive force, the alternator load is increased if the engine torque reaches the minimum engine torque that is a minimum torque that can be generated by the engine 10. Due to this, the torque output from the engine 10 to the automatic transmission 35 decreases, and therefore the actually generated drive force also decreases. That is, in the case where the engine torque has reached the minimum engine torque, increase in the alternator load will cause the actually generated drive force to be less than a minimum generated drive force that is a minimum drive force that can be generated at the present shift speed.

Thus, in the case where a drive force exceeding the drive force that can be generated by adjusting the degree of throttle opening is to be generated, that is, in the case where there is a further torque increase demand when the maximum engine torque is being output, or in the case where there is a further torque decrease demand when the minimum engine torque is being output, such a torque demand is fulfilled by coordinating the control of the degree of throttle opening and the control of the alternator load. Due to this, the speed change ratio shift timing can be postponed and the number of shifts performed can be decreased, so that shift shock at the time of shifting the speed change ratio or the shift-busy state caused by frequent performances of shift can be restrained. As a result, it is possible to improve the comfort of the vehicle 1 during the travelling of the vehicle 1 while certainly achieving the demanded drive force.

Besides, although the vehicle control apparatus 80 in accordance with the second embodiment postpones the shift timing by controlling the alternator load if the engine torque reaches the maximum torque or the minimum torque, the control of postponing the shift timing may also be performed in cases other than the case where the engine torque has reached the maximum torque or the minimum torque. For example, in the case where it is determined that the fluctuation of the driver's demanded drive force is small, from the accelerator operation amount or the speed of depression of the accelerator pedal 40, or the like, and where the present speed change ratio is not appropriate to achieve the demanded torque, the demanded drive force may be achieved by controlling the alternator load. Due to this, it is possible to perform a subtle control of the vehicle 1 while preventing response delay due to the shift of the speed change ratio or shift shock due to the shift. Incidentally, if the target drive force cannot be achieved by controlling the alternator load, or if the control of the alternator load continues beyond a predetermined set time, the automatic transmission is shifted in the speed change ratio.

Besides, if the demanded drive force is changing, the vehicle control apparatus 80 in accordance with the second embodiment performs the control of postponing the shift timing by performing the control of the alternator load. However, the control of changing the alternator load at the time of shifting the speed change ratio may also be performed for purposes other than the purpose of postponing the shift timing. For example, the control of the alternator load may also be utilized to control the torque during a downshift. When a downshift is to be performed, there is a need to increase the engine rotation speed to a rotation speed that is commensurate with the speed change ratio of the transmission line from the engine 10 to the driving wheels and with the vehicle speed. However, at the time of a downshift, since it is necessary to raise the engine rotation speed as described above, most of the engine torque is used to increase the engine rotation speed. Due to this, it sometimes happens that although the driver desires to accelerate the vehicle during a shift of the speed change ratio, the torque demanded by the driver cannot be output from the engine, and it becomes impossible to perform a subtle control. Therefore, if during a downshift of the speed change ratio, the accelerator pedal 40 is depressed and therefore the torque demanded by the driver becomes larger, the torque output from the engine 10 is increased by decreasing the alternator load. Due to this, the torque control in a region in which the torque cannot be controlled by adjusting only the degree of throttle opening, that is, the torque control within a short time during which the shift speed is changed, can be performed through the control of the alternator load, so that the traveling control of the vehicle 1 commensurate with the driver's demand can be performed.

Besides, the vehicle control apparatus 90 in accordance with the third embodiment secures an amount of control of the alternator load by reducing the alternator load provided that the demanded torque can be achieved even if the alternator load is reduced (see FIG. 13). The reduction of the alternator load in this manner will have an increased effect if the reduction is performed when the alternator 24 is generating electricity in the vicinity of the maximum limit. That is, in the case where the alternator 24 is generating electricity in the vicinity of the maximum limit, the alternator load cannot be increased even when it is desired that the torque output from the engine 10 be decreased by increasing the alternator load. Therefore, in the case where the alternator 24 is performing electricity generation in the vicinity of the maximum limit, it is determined whether or not the amount of electricity generation can be temporarily decreased on the basis of the battery current, and if the amount of electricity generation can be decreased, the amount of electricity generation is temporarily decreased before a demand of torque decrease is output. That is, the alternator load is temporarily decreased, and if there is a demand of torque decrease, the alternator load is increased. Due to this, the demanded torque can be more certainly achieved.

Besides, in the vehicle control apparatus 90 in accordance with the third embodiment, in the case where the alternator load is to be increased when there is a demand of torque decrease after the amount of electricity generation of the alternator 24 is temporarily decreased, if the coordinated control combining the control of the alternator load and the retardation control of the ignition timing is performed and the retardation control is performed at short intervals, the amount of electricity generation is gradually returned to the previous amount following the elapse of a predetermined set time during which the ignition timing retardation control cannot be performed. That is, since the retardation control of the ignition timing cannot be performed again in a short time after performance of the ignition timing retardation from the viewpoint of protecting the catalyst 20, performance of the retardation control of the ignition timing is performed, and then the alternator load is reduced and is set in a standby state in which the alternator load can be increased. After that, if there is a demand of torque decrease, a control of reducing the torque by increasing the alternator load is performed. After a predetermined set time during which the retardation control cannot be performed elapses, the alternator load is gradually reduced and the amount of retardation of the ignition timing is gradually increased. Due to this, it becomes possible to more appropriately perform the coordinated control combining the control of the alternator load for controlling the output from the engine 10, and the retardation control of the ignition timing.

Besides, if a control of setting the standby state in which the torque can be certainly decreased if there is a torque decrease demand, by temporarily reducing the amount of electricity generation of the alternator 24 and therefore bringing about a reduced state of the alternator load, is performed, a more appropriate control can be performed by estimating whether or not there is going to be a torque decrease demand. For example, at the time of shifting the speed change ratio of the automatic transmission 35, it can be known how many seconds it is before a torque decrease demand is output. Therefore, the amount of electricity generation of the alternator 24 is decreased while the battery voltage, that is, the electric power consumption, is being monitored. Then, in the case where the demanded torque can be achieved even if the alternator load is reduced, the amount of electricity generation is reduced beforehand. Thus, by predicting a future torque decrease demand and performing a control of reducing the alternator load on the basis of the prediction, the demanded torque can be more certainly achieved.

Besides, the controls performed by the vehicle control apparatuses 2, 80 and 90 in accordance with the first to third embodiments, and the other foregoing controls may be employed in combination. By appropriately combining controls according to the configurations of various apparatuses provided in the vehicle 1 or the manners in which the vehicle 1 is used, it becomes possible to appropriately perform the control of the load torque of the alternator 24 and another control such as the retardation control of the ignition timing or the like, and also to obtain an increased effect or a different effect in comparison with the case where the individual controls are singly performed. Due to this, it becomes possible to more appropriately perform the coordinated control combining the control of the load torque of the alternator 24 employed to control the output from the engine 10, and another control.

As described above, the vehicle control apparatus in accordance with the invention is useful for vehicles that is equipped with an accessory that is able to reduce the torque output from the engine by giving load to the engine and, more particularly, for vehicles in which the load given from an accessory to the engine can be arbitrarily adjusted when the engine is being operated.

While the invention has been described with reference to example embodiments thereof, it is to be understood that the invention is not limited to the example described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A vehicle control apparatus comprising:
an accessory that adjusts torque that is output from an internal combustion engine, by giving load to the internal combustion engine;
an ignition timing control portion that is provided so as to adjust ignition timing of the internal combustion engine, and that adjusts the torque output from the internal combustion engine by performing a retardation control of the ignition timing;
an accessory load adjustment portion that adjusts an accessory load that is the load given from the accessory to the internal combustion engine; and
a catalyst that purifies exhaust gas discharged from the internal combustion engine, wherein
the ignition timing control portion reduces the retardation of the ignition timing with increase in temperature of the catalyst, and the accessory load adjustment portion increases the accessory load with increase in the temperature of the catalyst.

2. The vehicle control apparatus according to claim 1, further comprising:
an intake air amount adjustment device that adjusts intake air amount when the internal combustion engine is operating, wherein
the accessory load adjustment portion increases amount of adjustment of the accessory load if load of the intake air amount adjustment device becomes greater than or equal to a predetermined load.

3. The vehicle control apparatus according to claim 1, further comprising:
a speed ratio shift apparatus that changes the torque output from the internal combustion engine at a desired speed change ratio, and outputs the torque to a driving wheel-side; and
a speed ratio shift control portion that performs a speed ratio shift control of the speed ratio shift apparatus, wherein
when drive force generated by the driving wheel is to be increased, the accessory load adjustment portion reduces the accessory load provided that the torque output from the internal combustion engine becomes equal to a predetermined torque, and the speed ratio shift control portion postpones shift timing to a timing that is later than a timing of changing the speed change ratio of the speed ratio shift apparatus which is set when the accessory load is not reduced.

4. The vehicle control apparatus according to claim 1, further comprising:
an intake air amount adjustment device that adjusts intake air amount when the internal combustion engine is operating, wherein
the accessory load adjustment portion increases amount of adjustment of the accessory load if a demand for adjustment of the torque exceeds a range that is achievable through adjustment of the intake air amount by the intake air amount adjustment device.

5. The vehicle control apparatus according to claim 1, wherein
the accessory is provided so as to generate electricity by using torque generated by the internal combustion engine, and so as to adjust the torque output from the internal combustion engine by adjusting magnitude of load given to the internal combustion engine while the accessory is generating electricity, and the accessory load adjustment portion increases amount of electricity generation of the accessory with decrease in temperature of an electricity storage device that stores electricity generated by the accessory.

6. The vehicle control apparatus according to claim 1, wherein
the accessory is provided so as to generate electricity by using torque generated by the internal combustion engine, and so as to adjust the torque output from the internal combustion engine by adjusting magnitude of the accessory load by changing amount of electricity generation of the accessory while the accessory is generating electricity, and the accessory load adjustment portion is provided so as to adjust the accessory load by controlling the amount of electricity generation of the accessory when the accessory generates electricity, and the accessory load adjustment portion reduces the accessory load with decrease in electric power consumption if a torque equal in magnitude to a demanded torque that is to be output from the internal combustion engine is able to be output from the internal combustion engine by reducing the accessory load, and the accessory load adjustment portion increases the accessory load if the demanded torque decreases while the accessory load has been reduced.

7. A vehicle control apparatus comprising:
an accessory that is provided so as to generate electricity by using torque generated by an internal combustion engine, and that adjusts the torque output from the internal combustion engine by adjusting magnitude of load given to the internal combustion engine while the accessory is generating electricity;
an electricity storage device that stores electricity generated by the accessory;
an ignition timing control portion that is provided so as to control ignition timing of the internal combustion engine, and that adjusts the torque output from the internal combustion engine by performing a retardation control of the ignition timing; and
an accessory load adjustment portion that adjusts an accessory load that is the load given from the accessory to the internal combustion engine, wherein
the ignition timing control portion reduces the retardation of the ignition timing with decrease in amount of stored electricity of the electricity storage device, and the accessory load adjustment portion increases the accessory load with decrease in the amount of stored electricity of the electricity storage device.

8. The vehicle control apparatus according to claim 7, further comprising:
an intake air amount adjustment device that adjusts intake air amount when the internal combustion engine is operating, wherein
the accessory load adjustment portion increases amount of adjustment of the accessory load if load of the intake air amount adjustment device becomes greater than or equal to a predetermined load.

9. The vehicle control apparatus according to claim 7, further comprising:
a speed ratio shift apparatus that changes the torque output from the internal combustion engine at a desired speed change ratio, and outputs the torque to a driving wheel-side; and a speed ratio shift control portion that performs a speed ratio shift control of the speed ratio shift apparatus, wherein when drive force generated by the driving wheel is to be increased, the accessory load adjustment portion reduces the accessory load provided that the torque output from the internal combustion engine becomes equal to a predetermined torque, and the speed ratio shift control portion postpones shift timing to a timing that is later than a timing of changing the speed change ratio of the speed ratio shift apparatus which is set when the accessory load is not reduced.

10. The vehicle control apparatus according to claim 7, further comprising:

an intake air amount adjustment device that adjusts intake air amount when the internal combustion engine is operating, wherein the accessory load adjustment portion increases amount of adjustment of the accessory load if a demand for adjustment of the torque exceeds a range that is achievable through adjustment of the intake air amount by the intake air amount adjustment device.

11. The vehicle control apparatus according to claim 7, wherein the accessory is provided so as to generate electricity by using torque generated by the internal combustion engine, and so as to adjust the torque output from the internal combustion engine by adjusting magnitude of load given to the internal combustion engine while the accessory is generating electricity, and the accessory load adjustment portion increases amount of electricity generation of the accessory with decrease in temperature of an electricity storage device that stores electricity generated by the accessory.

12. The vehicle control apparatus according to claim 7, wherein the accessory is provided so as to generate electricity by using torque generated by the internal combustion engine, and so as to adjust the torque output from the internal combustion engine by adjusting magnitude of the accessory load by changing amount of electricity generation of the accessory while the accessory is generating electricity, and the accessory load adjustment portion is provided so as to adjust the accessory load by controlling the amount of electricity generation of the accessory when the accessory generates electricity, and the accessory load adjustment portion reduces the accessory load with decrease in electric power consumption if a torque equal in magnitude to a demanded torque that is to be output from the internal combustion engine is able to be output from the internal combustion engine by reducing the accessory load, and the accessory load adjustment portion increases the accessory load if the demanded torque decreases while the accessory load has been reduced.

13. A vehicle control apparatus comprising:

an accessory that adjusts torque that is output from an internal combustion engine, by giving load to the internal combustion engine;

an ignition timing control portion that is provided so as to control ignition timing of the internal combustion engine, and that adjusts the torque output from the internal combustion engine by performing a retardation control of the ignition timing; and an accessory load adjustment portion that adjusts an accessory load that is the load given from the accessory to the internal combustion engine, wherein the accessory load adjustment portion increases the accessory load if the ignition timing reaches a misfire limit as the ignition timing control portion performs the retardation control.

14. The vehicle control apparatus according to claim 13, further comprising:

an intake air amount adjustment device that adjusts intake air amount when the internal combustion engine is operating, wherein the accessory load adjustment portion increases amount of adjustment of the accessory load if load of the intake air amount adjustment device becomes greater than or equal to a predetermined load.

15. The vehicle control apparatus according to claim 13, further comprising:

a speed ratio shift apparatus that changes the torque output from the internal combustion engine at a desired speed change ratio, and outputs the torque to a driving wheel-side; and a speed ratio shift control portion that performs a speed ratio shift control of the speed ratio shift apparatus, wherein when drive force generated by the driving wheel is to be increased, the accessory load adjustment portion reduces the accessory load provided that the torque output from the internal combustion engine becomes equal to a predetermined torque, and the speed ratio shift control portion postpones shift timing to a timing that is later than a timing of changing the speed change ratio of the speed ratio shift apparatus which is set when the accessory load is not reduced.

16. The vehicle control apparatus according to claim 13, further comprising:

an intake air amount adjustment device that adjusts intake air amount when the internal combustion engine is operating, wherein the accessory load adjustment portion increases amount of adjustment of the accessory load if a demand for adjustment of the torque exceeds a range that is achievable through adjustment of the intake air amount by the intake air amount adjustment device.

17. The vehicle control apparatus according to claim 13, wherein the accessory is provided so as to generate electricity by using torque generated by the internal combustion engine, and so as to adjust the torque output from the internal combustion engine by adjusting magnitude of load given to the internal combustion engine while the accessory is generating electricity, and the accessory load adjustment portion increases amount of electricity generation of the accessory with decrease in temperature of an electricity storage device that stores electricity generated by the accessory.

18. The vehicle control apparatus according to claim 13, wherein the accessory is provided so as to generate electricity by using torque generated by the internal combustion engine, and so as to adjust the torque output from the internal combustion engine by adjusting magnitude of the accessory load by changing amount of electricity generation of the accessory while the accessory is generating electricity, and the accessory load adjustment portion is provided so as to adjust the accessory load by controlling the amount of electricity generation of the accessory when the accessory generates electricity, and the accessory load adjustment portion reduces the accessory load with decrease in electric power consumption if a torque equal in magnitude to a demanded torque that is to be output from the internal combustion engine is able to be output from the internal combustion engine by reducing the accessory load, and the accessory load adjustment portion increases the accessory load if the demanded torque decreases while the accessory load has been reduced.

* * * * *